US009503439B2

(12) United States Patent
Okuyama et al.

(10) Patent No.: US 9,503,439 B2
(45) Date of Patent: Nov. 22, 2016

(54) COMMUNICATION SYSTEM AND COMMUNICATION METHOD

(71) Applicants: Taro Okuyama, Tokyo (JP); Takahiro Asai, Kanagawa (JP)

(72) Inventors: Taro Okuyama, Tokyo (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 166 days.

(21) Appl. No.: 14/026,069

(22) Filed: Sep. 13, 2013

(65) Prior Publication Data

US 2014/0101727 A1 Apr. 10, 2014

(30) Foreign Application Priority Data

Oct. 5, 2012 (JP) .................................. 2012-222929

(51) Int. Cl.
*H04L 29/06* (2006.01)
*G06F 21/31* (2013.01)
*H04L 12/58* (2006.01)
*G06F 21/62* (2013.01)

(52) U.S. Cl.
CPC .............. *H04L 63/08* (2013.01); *H04L 63/20* (2013.01); *G06F 21/31* (2013.01); *G06F 21/6218* (2013.01); *H04L 51/24* (2013.01)

(58) Field of Classification Search
CPC ..................... H04L 63/08; H04L 63/10; H04L 12/1818; H04L 51/24; H04L 51/36; G06F 21/6218; G06F 21/31
See application file for complete search history.

(56) References Cited

U.S. PATENT DOCUMENTS

| 8,260,268 B2 * | 9/2012 | Cho ................ H04M 1/274516 455/414.1 |
| 8,493,594 B2 | 7/2013 | Ishikawa et al. |
| 2004/0151300 A1 * | 8/2004 | Marwell et al. ......... 379/265.13 |
| 2007/0288572 A1 * | 12/2007 | Busa ...................... G06Q 10/06 709/205 |
| 2010/0214090 A1 * | 8/2010 | Sartini .................. H04L 12/581 340/517 |
| 2011/0093941 A1 * | 4/2011 | Liu et al. .......................... 726/7 |
| 2011/0219060 A1 | 9/2011 | Ohwada |

(Continued)

FOREIGN PATENT DOCUMENTS

| JP | 2002-281223 | 9/2002 |
| JP | 2005-301601 | 10/2005 |

(Continued)

OTHER PUBLICATIONS

Office Action mailed Aug. 30, 2016, in Japanese Patent Application No. 2012-222929.

*Primary Examiner* — Benjamin Lanier
*Assistant Examiner* — Shaqueal Wade
(74) *Attorney, Agent, or Firm* — Oblon, McClelland, Maier & Neustadt, L.L.P.

(57) ABSTRACT

A communication system includes a transmission terminal and a management device, and when having received contact list information about a second user from the management device while displaying a contact list about a first user or the transmission terminal, the transmission terminal creates the contact list about the second user based on the contact list information about the second user, and displays the contact list of the second user.

8 Claims, 21 Drawing Sheets

(56) References Cited

U.S. PATENT DOCUMENTS

2011/0219371 A1* 9/2011 Eide ................. G06F 9/455
                                                       718/1
2011/0304864 A1   12/2011 Akutsu
2012/0092438 A1*  4/2012 Guzman Suarez
                                 et al. ................. 348/14.03

FOREIGN PATENT DOCUMENTS

| JP | 2010-146485 | 7/2010 |
| JP | 2010-157019 | 7/2010 |
| JP | 2011-205612 | 10/2011 |
| JP | 2011-259283 | 12/2011 |

* cited by examiner

FIG.6

AUTHENTICATION
MANAGEMENT TABLE

| ID | PASSWORD |
|---|---|
| 10aa | aaaa |
| 10ab | abab |
| 10ba | baba |
| 10db | xxxyyy |
| ... | ... |
| 100cd | aaaa |
| 100cf | abab |
| 100cg | baba |
| ... | ... |

FIG.7

TERMINAL MANAGEMENT TABLE

| TERMINAL ID | TERMINAL NAME | OPERATION STATE | DATE AND TIME OF RECEPTION | IP ADDRESS OF TERMINAL |
|---|---|---|---|---|
| 10aa | JAPAN TOKYO OFFICE TERMINAL AA | ON LINE (TELEPHONE CALL POSSIBLE) | 2009.11.10.13:40 | 1.2.1.3 |
| 10ab | JAPAN TOKYO OFFICE TERMINAL AB | OFF LINE | 2009.11.09.12:00 | 1.2.1.4 |
| ... | ... | ... | ... | ... |
| 10ba | JAPAN OSAKA OFFICE TERMINAL BA | ON LINE (TELEPHONE CALL POSSIBLE) | 2009.11.10.13:45 | 1.2.2.3 |
| 10bb | JAPAN OSAKA OFFICE TERMINAL BB | ON LINE (DURING TEMPORARILY DISCONTINUED) | 2009.11.10.13:50 | 1.2.2.4 |
| ... | ... | ... | ... | ... |
| 10ca | UNITED STATES OF AMERICA NEW YORK OFFICE TERMINAL CA | OFF LINE | 2009.11.10.12:45 | 1.3.1.3 |
| 10cb | UNITED STATES OF AMERICA NEW YORK OFFICE TERMINAL CB | ON LINE (DURING TELEPHONE CALL) | 2009.11.10.13:55 | 1.3.1.4 |
| ... | ... | ... | ... | ... |
| 10da | UNITED STATES OF AMERICA WASHINGTON OFFICE TERMINAL DA | ON LINE (DURING TELEPHONE CALL) | 2009.11.08.12:45 | 1.3.2.3 |
| 10db | UNITED STATES OF AMERICA WASHINGTON OFFICE TERMINAL DB | ON LINE (TELEPHONE CALL POSSIBLE) | 2009.11.10.12:45 | 1.3.2.4 |
| ... | ... | ... | ... | ... |

FIG.8

CONTACT LIST MANAGEMENT TABLE

| ID | CONTACT TERMINAL ID |
|---|---|
| 10aa | 10ab, 10ac, 10ad, 10ae |
| 10ab | 10aa, 10ca, 10cb |
| 10ba | 10aa, 10ab, 10ca, 10cb, 10da, 10db |
| ... | ... |
| 100cd | 10gj, 10kb, 10tk |
| 100cf | 10dd, 10cg |
| 100cg | 10af, 10cd, 10cc |
| 10db | 10aa, 10cb, 10ad |
| ... | ... |

FIG.12
CONTACT LIST: USER (100cd)
| STATE | TERMINAL ID | TERMINAL NAME |
|---|---|---|
|  | 10gj | JAPAN HYOGO OFFICE TERMINAL GJ |
|  | 10kb | JAPAN OSAKA OFFICE TERMINAL KB |
|  | 10tk | JAPAN FUKUOKA OFFICE TERMINAL TK |

FIG.13
CONTACT LIST: USER (100cd)
| 10aa | 100cd |
| STATE | TERMINAL ID | TERMINAL NAME |
|---|---|---|
|  | 10gj | JAPAN HYOGO OFFICE TERMINAL GJ |
|  | 10kb | JAPAN OSAKA OFFICE TERMINAL KB |
|  | 10tk | JAPAN FUKUOKA OFFICE TERMINAL TK |

FIG.15

PERSONAL SETTING MANAGEMENT TABLE

| ID | LANGUAGE | LETTER SIZE | BACKGROUND THEME | CONTACT LIST FORMAT |
|---|---|---|---|---|
| 100cd | ENGLISH | LARGE | NORMAL | ALL DISPLAY |
| 100cf | JAPANESE | SMALL | SEPIA | TAB SWITCHING |
| ... | ... | ... | ... | ... |

FIG.17

CONTACT LIST: USER (100cd)

| STATUS | DEVICE ID | DEVICE NAME |
|---|---|---|
| 📞 | 10ab | JAPAN TOKYO OFFICE DEVICE AB |
| 📞 | 10ac | JAPAN TOKYO OFFICE DEVICE AC |
| 📞 | 10ad | JAPAN TOKYO OFFICE DEVICE AD |
| 📞 | 10ae | JAPAN TOKYO OFFICE DEVICE AE |
| 📞 | 10gj | JAPAN HYOGO OFFICE DEVICE GJ |

FIG.19

PERSONAL SETTING MANAGEMENT TABLE

| ID | LANGUAGE | LETTER SIZE | BACKGROUND THEME | CONTACT LIST FORMAT | AVAILABLE FUNCTION |
|---|---|---|---|---|---|
| 100cd | ENGLISH | LARGE | NORMAL | ALL DISPLAY | TERMINAL INITIALIZATION, CONNECTION DIAGNOSIS |
| 100cf | JAPANESE | SMALL | SEPIA | TAB SWITCHING | PARTICIPANT RESTRICTED CONFERENCE |
| ... | ... | ... | ... | ... | ... |

COMMUNICATION SYSTEM AND COMMUNICATION METHOD

CROSS-REFERENCE TO RELATED APPLICATIONS

The present application claims priority to and incorporates by reference the entire contents of Japanese Patent Application No. 2012-222929 filed in Japan on Oct. 5, 2012.

BACKGROUND OF THE INVENTION

1. Field of the Invention

The present invention relates to a communication system and a communication method.

2. Description of the Related Art

With the development of cloud computing, various devices other than personal computers are used as client terminals of a cloud service. For example, a television, a television conference terminal, and the like in addition to a smartphone and a tablet terminal are used as the terminals of a cloud service. These client terminals do not hold information to be displayed on a screen, setting information of a terminal, and an address book if the client terminal is a communication terminal, and a method is known, in which these pieces of information are obtained from the cloud through the network based on identification information of the terminals, such as IDs.

For example, to grasp the state of a partner telephone call terminal in a television conference system in real time, Japanese Laid-open Patent Publication No. 2011-205612 discloses a technology in which contact information registered in each telephone call terminal is managed in a transmission management system that manages telephone call terminals, contact information unique to a telephone call terminal is obtained from the transmission management system in accordance with an authentication result after start-up of the telephone call terminal, and the contact information is displayed as a contact list.

Further, to prevent reduction in efficiency and quality of medical practice caused by medical doctors who use shared medical terminal devices by using unfamiliar terminal device, environment for usage, and clinical application, Japanese Laid-open Patent Publication No. 2010-157019 discloses technologies of medical image processing system and server that enable use of the environment for usage and a clinical application customized for each user in accordance with an authentication result of the user.

However, since the client terminal on such a previous cloud service obtains display information, setting information, address book information, and the like based on the identification information of the terminal, if the client terminal is a shared terminal, it is difficult to easily and promptly customize such information according to the user who uses the terminal.

For example, assuming a service in which an address book in a communication terminal such as a television conference terminal is obtained from a cloud based on a terminal ID, when the client terminal is shared by a plurality of users, the number of address books becomes too large and complicated, and it is difficult to search an object contact. In addition, in such a previous technology, it is difficult to strengthen the security because even a contact that one does not want other users to view or a contact that one does not want to start a conference needs to be shared by the users.

In addition, there are client terminals customized for each user, having a form of performing user authentication by inputting information such as an ID and a password when starting up, and providing a customized user interface. However, it takes time when it is desired to quickly change the user without cutting the power source and the like, and it is difficult to easily and promptly perform customization.

Therefore, it is desirable to provide a communication system and a communication method capable of easily and promptly customizing a transmission terminal for each user and strengthening security.

SUMMARY OF THE INVENTION

It is an object of the present invention to at least partially solve the problems in the conventional technology.

According to an aspect of the present invention, there is provided a communication system including a transmission terminal and a management device connected to the transmission terminal over a network, the management device including: a first storage unit configured to store authentication management information in which identification information for identifying the transmission terminal or a user, and authentication information of the transmission terminal or the user are associated with each other; a second storage unit configured to store contact list management information in which the identification information for identifying the transmission terminal or a user, and the identification information of one or a plurality of contact terminal candidates serving as a potential partner of the transmission terminal or the user are associated with each other; a first reception unit configured to receive a log-in request including the identification information and the authentication information of the transmission terminal or the user from the transmission terminal; an authentication unit configured to perform authentication of the transmission terminal or the user based on the identification information and the authentication information of the transmission terminal or the user included in the log-in request, and the authentication management information; when the transmission terminal or the user is authenticated and in a log-in state, a terminal extraction unit configured to extract, from the contact list management information, the identification information of the contact terminal candidate corresponding to the identification information of the authenticated transmission terminal or the authenticated user; and a first transmission unit configured to transmit contact list information including the identification information of the extracted contact terminal candidate to the transmission terminal, and the transmission terminal including: a second transmission unit configured to transmit the log-in request including the identification information and the authentication information of the transmission terminal or the user to the management device; a second reception unit configured to receive the contact list information from the management device; a contact list creation unit configured to create a contact list about the transmission terminal or the user, the contact list including information related to a contact terminal candidate of the transmission terminal or the user, based on the contact list information; a display unit configured to display the contact list about the transmission terminal or the user; and in a log-in state, an authentication information acquisition unit configured to acquire the identification information and the authentication information of a second user who uses the transmission terminal other than the transmission terminal and the user, wherein the second transmission unit transmits the identification information and the authentication information of the second user to the management device, the first reception unit receives the identification information and the authentication information of the second user from the transmission terminal, in a case of receiving the identification information and the authentication information of the second user, the authentication unit performs authentication of the second user based on the authentication management information, in a case where the second user is authenticated, the terminal extraction unit acquires the identification information of the contact terminal candidate corresponding to the identification information of the second user from the contact list management information, the first transmission unit transmits, to the transmission terminal, contact list information about the second user, the contact list information including the extracted identification information of the contact terminal candidate corresponding to the identification information of the second user, the second reception unit receives the contact list information about the second user from the management device, the contact list creation unit creates a contact list about the second user based on the contact list information about the second user, and the display unit further displays the contact list of the second user.

According to another aspect of the present invention, there is provided a communication system including a program for causing a computer to function and a management device connected to the computer over a network, the management device including: a first storage unit configured to store authentication management information in which identification information for identifying the computer or a user, and authentication information of the computer or the user are associated with each other; a second storage unit configured to store contact list management information in which the identification information for identifying the computer or a user, and the identification information of one or a plurality of contact terminal candidates serving as a potential partner of the computer or the user are associated with each other;

a first reception unit configured to receive a log-in request including the identification information and the authentication information of the computer or the user from the computer; an authentication unit configured to perform authentication of the computer or the user based on the identification information and the authentication information of the computer or the user included in the log-in request, and the authentication management information; when the computer or the user is authenticated and in a log-in state, a terminal extraction unit configured to extract, from the contact list management information, the identification information of the contact terminal candidate corresponding to the identification information of the authenticated computer or the authenticated user; and a first transmission unit configured to transmit contact list information including the identification information of the extracted contact terminal candidate to the computer, and the program causing the computer to function as: a second transmission unit configured to transmit the log-in request including the identification information and the authentication information of the computer or the user to the management device; a second reception unit configured to receive the contact list information from the management device; a contact list creation unit configured to create a contact list about the computer or the user, the contact list including information related to a contact terminal candidate of the computer or the user, based on the contact list information; a display unit configured to display the contact list about the computer or the user; and in a log-in state, an authentication information acquisition unit configured to acquire the identification information and the authentication information of a second user who uses the transmission terminal other than the computer and the user, wherein the second transmission unit transmits the identification information and the authentication information of the second user to the management device, the first reception unit receives the identification information and the authentication information of the second user from the computer, in a case of receiving the identification information and the authentication information of the second user, the authentication unit performs authentication of the second user based on the authentication management information, in a case where the second user is authenticated, the terminal extraction unit acquires the identification information of the contact terminal candidate corresponding to the identification information of the second user from the contact list management information, the first transmission unit transmits, to the computer, contact list information about the second user, the contact list information including the extracted identification information of the contact terminal candidate corresponding to the identification information of the second user, the second reception unit receives the contact list information about the second user from the management device, the contact list creation unit creates a contact list about the second user based on the contact list information about the second user, and the display unit further displays the contact list of the second user.

According to still another aspect of the present invention, there is provided a communication method performed by a communication system including a transmission terminal, and a management device connected to the transmission terminal over a network, the management device comprising a first storage unit configured to store authentication management information in which identification information for identifying the transmission terminal or a user, and authentication information of the transmission terminal or the user are associated with each other, and a second storage unit configured to store contact list management information in which the identification information for identifying the transmission terminal or a user, and the identification information of one or a plurality of contact terminal candidates serving as a potential partner of the transmission terminal or the user are associated with each other, and the communication method including: transmitting, by the transmission terminal, a log-in request including the identification information and the authentication information of the transmission terminal or the user to the management device; receiving, by the management device, the log-in request from the transmission terminal; performing, by the management device, authentication of the transmission terminal or the user based on the identification information and the authentication information of the transmission terminal or the user included in the log-in request, and the authentication management information; when the transmission terminal or the user is authenticated and in a log-in state, extracting, by the management device, from the contact list management information, the identification information of the contact terminal candidate corresponding to the identification information of the authenticated transmission terminal or the authenticated user; transmitting, by the management device, contact list information including the identification information of the extracted contact terminal candidate to the transmission terminal; receiving, by the transmission terminal, the contact list information from the management device; creating, by the transmission terminal, a contact list about the transmission terminal or the user, the contact list including information related to a contact terminal candidate of the transmission terminal or the user, based on the contact list information; displaying, by the transmission terminal, the contact list about the transmission terminal or the user; in a log-in state, acquiring, by the transmission terminal, the identification information and the authentication information of a second user who uses the computer other than the transmission terminal and the user; transmitting, by the transmission terminal, the identification information and the authentication information of the second user to the management device; receiving, by the management device, the identification information and the authentication information of the second user from transmission terminal; in a case of receiving the identification information and the authentication information of the second user, performing, by the management device, authentication of the second user based on the authentication management information; in a case where the second user is authenticated, acquiring, by the management device, the identification information of the contact terminal candidate corresponding to the identification information of the second user from the contact list management information; transmitting, by the management device, to the transmission terminal, contact list information about the second user, the contact list information including the extracted identification information of the contact terminal candidate corresponding to the identification information of the second user; receiving, by the transmission terminal, the contact list information about the second user from the management device; creating, by the transmission terminal, a contact list about the second user based on the contact list information about the second user; and displaying, by the transmission terminal, the contact list of the second user.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a concept diagram illustrating an authentication management table;

FIG. 7 is a concept diagram illustrating a terminal management table;

FIG. 8 is a concept diagram illustrating a contact list management table;

FIG. 12 is a diagram illustrating a display example of the contact list after the contact list has been switched by user authentication;

FIG. 13 is a diagram illustrating another display example of the contact list after the contact list has been switched by user authentication;

FIG. 15 is a diagram illustrating an example of a personal setting management table;

FIG. 17 is a diagram illustrating a display example of the contact list updated based on personal setting information in the second embodiment;

FIG. 19 is a diagram illustrating an example of a personal setting management table of a third embodiment;

DETAILED DESCRIPTION OF THE PREFERRED EMBODIMENTS

Hereinafter, embodiments of a communication system and a communication method will be described with reference to the appended drawings.

First Embodiment

Overall Configuration of Embodiments

Figure 1:
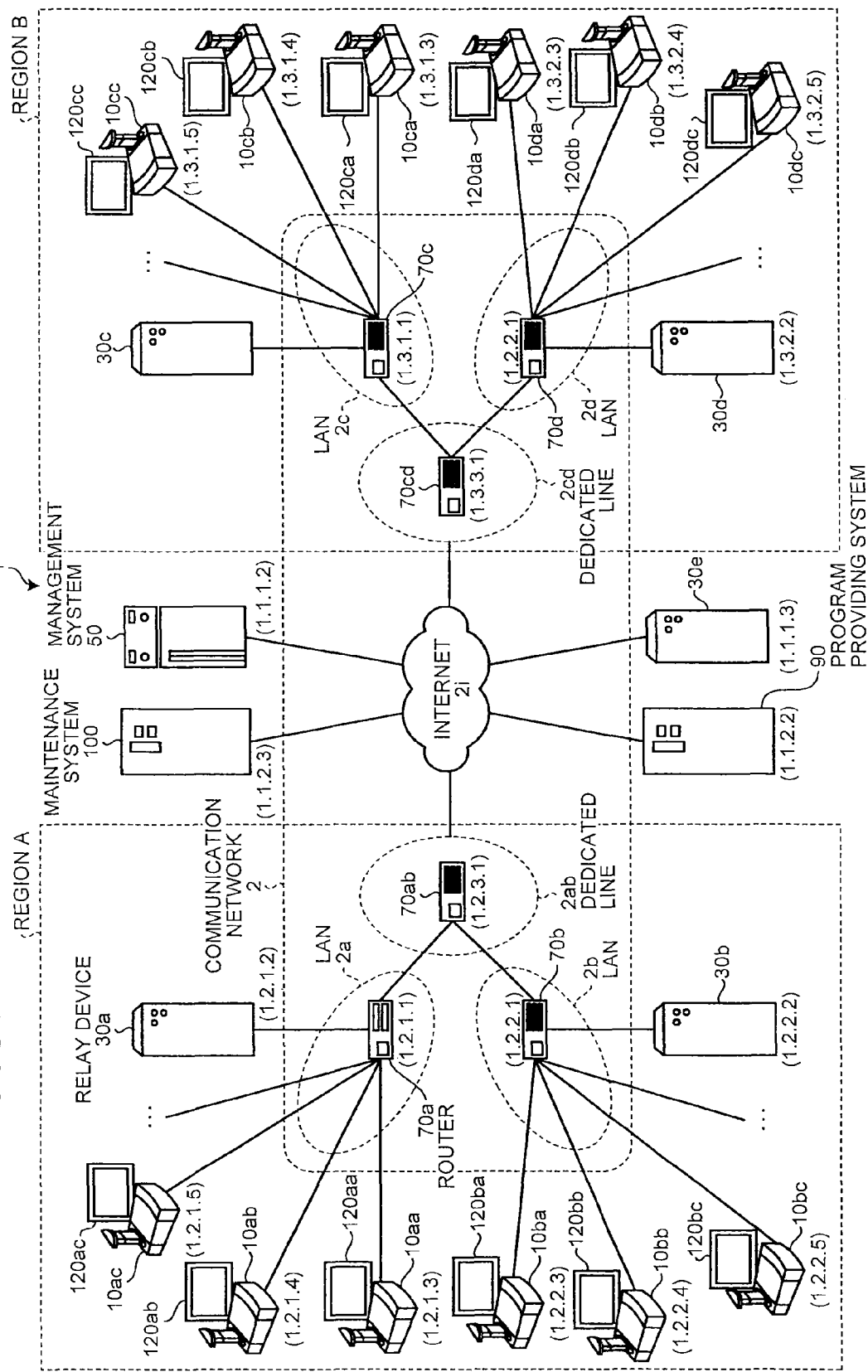
FIG. 1 is a schematic diagram of a transmission system.

FIG. 1 is a schematic diagram of a transmission system 1 as a communication system according to an embodiment, and an outline of the present embodiment will be described with reference to FIG. 1.

The transmission system 1 includes a data providing system that transmits content data from one transmission terminal to another transmission terminal through a transmission management system and a communication system that transmits information, feeling, and the like among a plurality of transmission terminals through the transmission management system. This communication system is a system for mutually transmitting information, feeling, and the like among a plurality of communication terminals (corresponding to "transmission terminals") through a communication management system (corresponding to the "transmission management system"), and examples of the communication system include a television conference system, a videophone system, an audio teleconference system, a voice telephony system, and a personal computer (PC) screen sharing system.

In the present embodiment, the transmission system 1, a management system 50, and a transmission terminal 10 will be described, assuming a television conference system as an example of the communication system, a television conference management system as an example of the communication management system, and a television conference terminal as an example of the communication terminal. That is, the communication system of the present invention is applied not only to a television conference system, but also to a communication system, a transmission system, and the like.

The transmission system 1 illustrated in FIG. 1 is configured from a plurality of transmission terminals (10aa, 10ab, . . . ), displays (120aa, 120ab, . . . ) for the transmission terminals (10aa, 10ab, . . . ), a plurality of relay devices (30a, 30b, 30c, 30d, and 30e), the management system 50, a program providing system 90, and a maintenance system 100. Note that, hereinafter, the "transmission terminal" will be simply expressed as a "terminal", and the "transmission management system" will be simply expressed as a "management system".

Note that, in the present embodiment, when an arbitrary transmission terminal from among the transmission terminals (10aa, 10ab, . . . ) is indicated, the "transmission terminal 10" is used, when an arbitrary display from among the displays (120aa, 120ab, . . . ) is indicated, the "display 120" is used, and when an arbitrary relay device from among the relay devices (30a, 30b, 30c, 30d, and 30e) is indicated, the "relay device 30" is used.

The transmission terminal 10 transmits/receives various types of information to/from other devices. The transmission terminal 10 establishes a session with another terminal 10, for example, and makes a telephone call by transmission/reception of content data including audio data and image data in the established session. Accordingly, a television conference among a plurality of terminals 10 is realized in the transmission system 1.

Hereinafter, the "image data and audio data" are expressed as the "content data". Note that the data transmitted among the terminals 10 is not limited to the embodiment. The content data may be text data as another example, or may be text data in addition to the audio data and the image data. The image data may be a moving image or a still image. The image data may include both of the moving image and the still image.

Further, when a television conference is started in the transmission system 1 according to the present embodiment, a predetermined terminal 10 is operated by a user who wishes the start of the conference, and the operated terminal 10 transmits start request information to the management system 50.

Here, the start request information is information requesting start of a session to be used in a television conference, and includes information specifying the terminal 10 as a session partner. Hereinafter, the terminal 10 that transmits the start request information will be referred to as a start request terminal. In addition, the terminal 10 that is specified as the session partner will be referred to as a contact terminal.

Note that the contact terminal (session partner) may be one terminal 10, or may be two or more terminals 10. That is, in the transmission system 1, a television conference using a session established not only between two terminals 10, but also among three or more terminal 10 can be realized.

The management system 50 unitarily manages the terminals 10 and the relay device 30. By establishing a session among the terminals 10, the management system 50 realizes a television conference by a telephone call and the like among the terminals 10.

When having received start request information from a predetermined terminal 10, the management system 50 establishes a session between the terminal 10 (start request terminal) that has transmitted the start request information of a session and the contact terminal, and starts a television conference.

In addition, a plurality of routers (70a, 70b, 70c, 70d, 70ab, and 70cd) illustrated in FIG. 1 selects an optimum path of content data. Note that, in the present embodiment, when an arbitrary router among the routers (70a, 70b, 70c, 70d, 70ab, and 70cd) is indicated, a "router 70" is used. The relay device 30 relays the content data among a plurality of terminals 10.

The program providing system 90 is provided with an hard disk (HD) (not illustrated) in which a terminal program for causing the terminal 10 to realize various functions or various means is stored, and can transmit the terminal program to the terminal 10. In addition, a relay device program for causing the relay device 30 to realize various functions or various means is stored in the HD of the program providing system 90, and the program providing system 90 can transmit the relay device program to the relay device 30. Further, a transmission management program for causing the management system 50 to realize various functions or various means is also stored in the HD of the program providing system 90, and the program providing system 90 can transmit the transmission management program to the management system 50.

The maintenance system 100 is a computer for performing maintenance and management of at least one from the terminals 10, the relay device 30, the management system 50, and the program providing system 90. For example, when the maintenance system 100 is located within a country, and the terminal 10, the relay device 30, the management system 50, or the program providing system 90 is located outside the country, the maintenance system 100 remotely performs maintenance and management of at least one from the terminal 10, the relay device 30, the management system 50, and the program providing system 90 through the communication network 2. In addition, the maintenance system 100 performs maintenance such as management of a model number, a serial number, a sales contact, maintenance check, and a failure history of at least one from the terminal 10, the relay device 30, the management system 50, and the program providing system 90 without through the communication network 2.

The terminals (10aa, 10ab, 10ac, 10a . . . ), the relay device 30a, and the router 70a are connected by a LAN 2a in a communication capable manner. The terminal (10ba, 10bb, 10bc, 10b . . . ), the relay device 30b, and the router 70b are connected by a LAN 2b in a communication capable manner. Further, the LAN 2a and the LAN 2b are connected by a dedicated line 2ab including the router 70ab in a communication capable manner, and are built within a predetermined region A. For example, the region A is Japan, the LAN 2a is built in an office in Tokyo, and the LAN 2b is built in an office in Osaka.

Meanwhile, the terminals (10ca, 10cb, 10cc, 10c, . . . ), the relay device 30c, and the router 70c are connected by a LAN 2c in a communication capable manner. The terminal (10da, 10db, 10dc, 10d, . . . ), the relay device 30d, and the router 70d are connected by a LAN 2d in a communication capable manner. Further, the LAN 2c and the LAN 2d are connected by a dedicated line 2cd including the router 70cd in a communication capable manner, and is built in a predetermined region B. For example, a region B is the United States of America, the LAN 2c is built in an office in New York, and the LAN 2d is built in an office in Washington D.C. The region A and the region B are connected in a communication capable manner through the Internet 2i through the respective routers (70ab and 70cd).

In addition, the management system 50 and the program providing system 90 are connected with the terminal 10 and the relay device 30 through the Internet 2i in a communication capable manner. The management system 50 and the program providing system 90 may be located in the region A or the region B, or may be located in a region outside the regions A and B.

Further, the relay device 30e is connected with the terminals 10 through the Internet 2i in a communication capable manner. This relay device 30e constantly operates, and is located in a region other than the regions A and B so as to be less likely to be influenced by traffic in a local area of the region A or the region B. Accordingly, when the terminal 10 makes a telephone call with a terminal located in another local area, the relay device 30e is used as a relay device for relaying content data. When terminals within the same local area make a telephone call, and even if the relay device located in the local area is not operating, the relay device 30e is used as an emergency relay device.

Note that, in the present embodiment, a communication network 2 of the present embodiment is built by the LAN 2a, the LAN 2b, the dedicated line tab, the Internet 2i, the dedicated line 2cd, the LAN 2c, and the LAN 2d. This communication network 2 may include a place in which not only wired communication but also wireless communication is performed.

Sets of four numbers indicated under each terminal 10, each relay device 30, the management system 50, each router 70, the program providing system 90, and the maintenance system 100 in FIG. 1 simply indicate an IP address in typical IPv4. For example, the IP address of the terminal 10aa is "1.2.1.3". Although IPv6 may be used instead of IPv4, description will be given using IPv4 for simplifying the description.

Hardware Configuration of Embodiment

Figure 4:
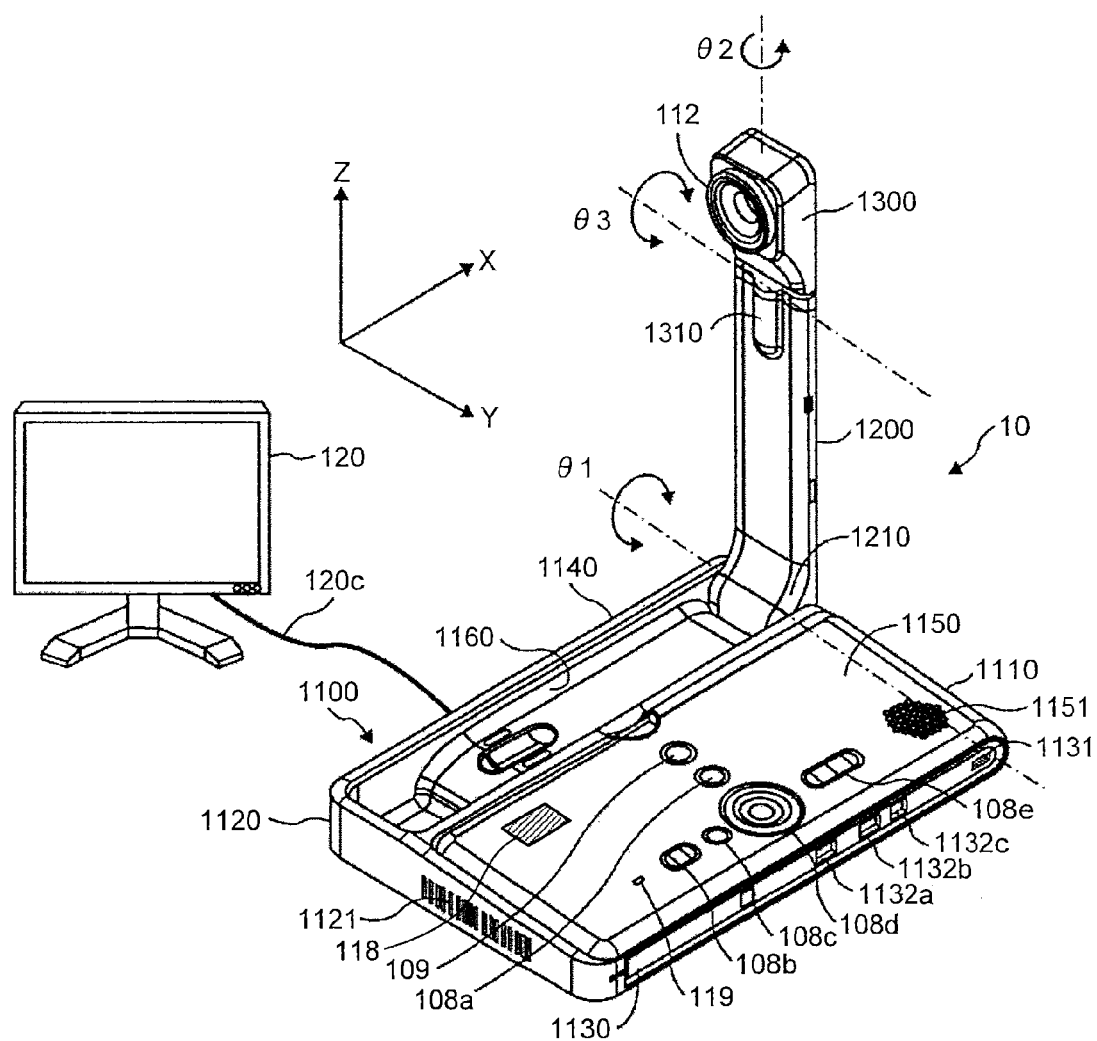
FIG. 4 is an outline view of the transmission terminal.

Next, a hardware configuration of the present embodiment will be described. FIG. 4 is an outline view of the terminal 10. Hereinafter, the description will be given where a longitudinal direction of the terminal 10 is an X-axis direction, a direction perpendicular to the X-axis direction within a horizontal plane is an Y-axis direction, a direction perpendicular to the X-axis direction and the Y-axis direction (vertical direction) is a Z-axis direction.

As illustrated in FIG. 4, the terminal 10 is provided with a housing 1100, an arm 1200, and a camera housing 1300. Among them, an intake surface (not illustrated) formed with a plurality of intake holes is provided on a front-side wall surface 1110 of the housing 1100, and an exhaust surface 1121 formed with a plurality of exhaust holes is provided in a rear-side wall surface 1120 of the housing 1100. Accordingly, air in the front of the terminal 10 is taken in through the intake surface (not illustrated) by driving of a cooling fan housed in the housing 1100, and can be exhausted toward the rear of the terminal 10 through the exhaust surface 1121. A sound absorption hole 1131 is formed in a right-side wall surface 1130 of the housing 1100, and a voice, a sound, a noise and the like can be absorbed by a built-in type microphone 114 described below.

An operation panel 1150 is formed on a side of the right-side wall surface 1130 of the housing 1100. A plurality of operation buttons (108a to 108e), a power switch 109, and an alarm lamp 119, all described below, are provided on the operation panel 1150, and a sound output surface 1151 formed with a plurality of audio output holes for allowing an output sound from a built-in type speaker 115 described below to pass through is formed on the operation panel 1150. In addition, an authentication reception I/F 118 is provided on the operation panel 1150.

The authentication reception I/F 118 is an interface that receives an input of authentication information from a user, and, to be specific, corresponds to an IC card reader or a reader of an SD card, an SIM card, and the like.

A housing part 1160 as a concave portion for housing the arm 1200 and the camera housing 1300 is formed in the housing 1100 at a left-side wall surface 1140 side. A plurality of connection ports (1132a to 1132c) for electrically connecting a cable to an external device connection I/F 181 described below is provided in the right-side wall surface 1130 of the housing 1100. Meanwhile, a connection port (not illustrated) for electrically connecting a cable 120c for a display 120 to the external device connection I/F 181 is provided in a left-side wall surface 1140 of the housing 1100.

Note that, hereinafter, when an arbitrary operation button from among the operation buttons (108a to 108e) is indicated, an "operation button 108" is used, and when an arbitrary connection port from among the connection ports (1132a to 1132c) is indicated, a "connection port 1132" is used.

Next, the arm 1200 is attached to the housing 1100 through a torque hinge 1210, and the arm 1200 is revolvable to the housing 1100 in an up and down direction in a range of a tilt angle θ1 of 135 degrees. FIG. 4 illustrates a state where the tilt angle θ1 is 90 degrees.

A built-in type camera 112 described below is provided in the camera housing 1300, and can image a user, a document, a room, and the like. In addition, a torque hinge 1310 is formed in the camera housing 1300. The camera housing 1300 is attached to the arm 1200 through the torque hinge 1310. Then, the camera housing 1300 is attached to the arm 1200 through the torque hinge 1310, and the camera housing 1300 is revolvable to the arm 1200 in an up and down, and right and left directions in a range of a pan angle θ2 of ±180 degrees where the state illustrated in FIG. 4 is 0 degree, and in a range of a tilt angle θ3 of ±45 degrees.

Note that, as another example, the terminal 10 may be a general purpose computer. When a microphone and a camera are not provided in the computer used as the terminal 10, an external microphone and camera are connected to the computer. Accordingly, a general purpose computer can be used as the terminal 10 according to the present embodiment. In addition, when the general purpose computer is used as the terminal 10, an application described below for executing processing of the terminal 10 is installed in the computer in advance.

Note that the relay device 30, the management system 50, the program providing system 90, and the maintenance system 100 have the same appearance as general server/computer, and therefore description of the appearance is omitted.

Figure 2:
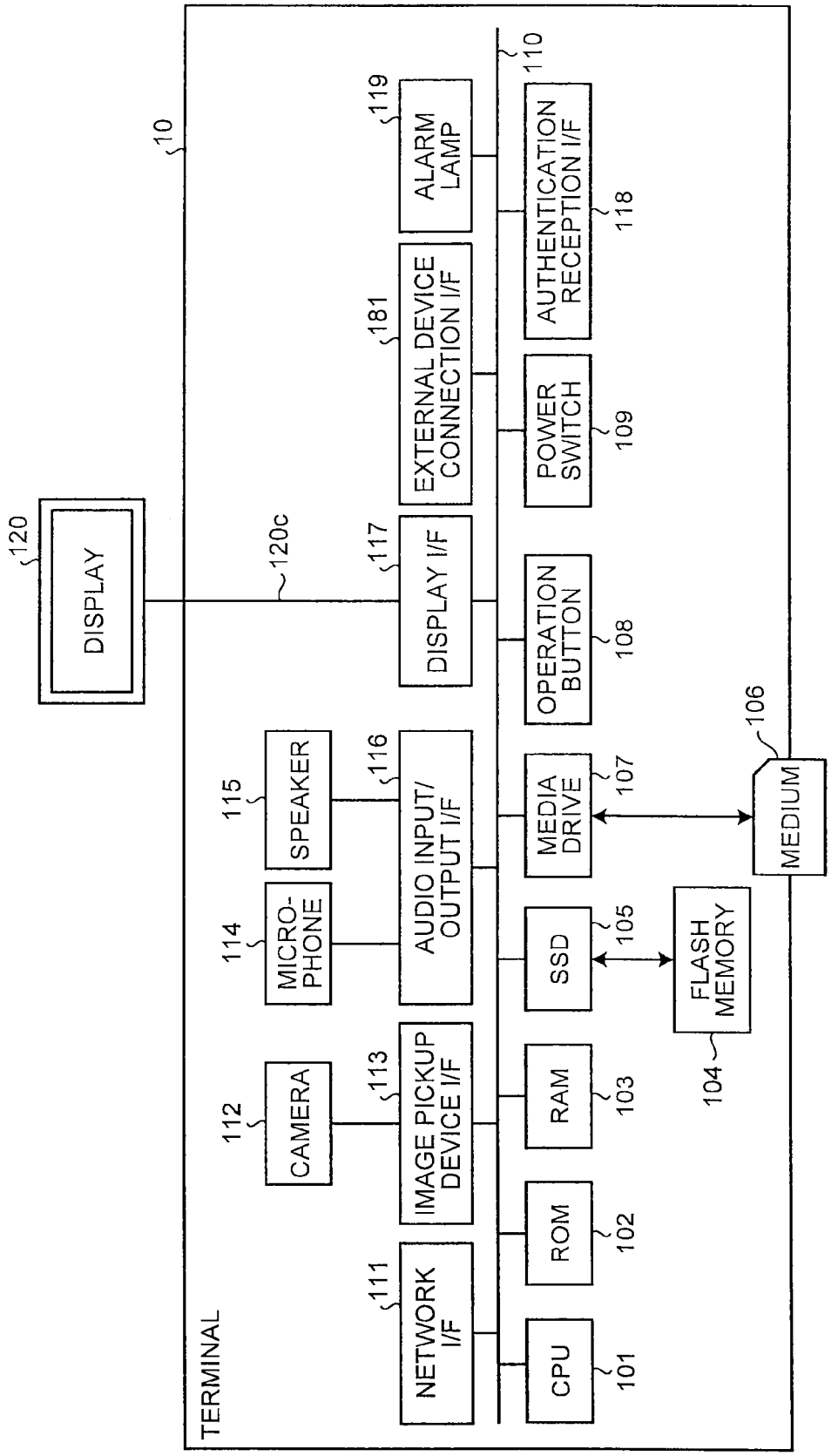
FIG. 2 is a hardware configuration diagram of a transmission terminal.

FIG. 2 is a hardware configuration diagram of the terminal 10 according to the embodiment. As illustrated in FIG. 2, the terminal 10 of the present embodiment includes a central processing unit (CPU) 101 that controls an operation of the entire terminal 10, a read only memory (ROM) 102 that stores a terminal program, a random access memory (RAM) 103 used as a work area of the CPU 101, a flash memory 104 that stores various types of data such as image data and audio data, a solid state drive (SSD) 105 that controls reading/writing of the various types of data to/from the flash memory 104 according to control of the CPU 101, a media drive 107 that controls reading/writing (storing) of data to/from the recording medium 106 such as flash memory, an operation button 108 that is controlled when a contact of the terminal 10 is selected, a power switch 109 for switching ON/OFF of a power source of the terminal 10, a network interface (I/F) 111 for transmitting data using the communication network 2 described below, and an authentication reception I/F 118 described using FIG. 4.

In addition, the terminal 10 includes the built-in type camera 112 that obtains image data by imaging an object according to control of the CPU 101, an image pickup device I/F 113 that controls driving of the camera 112, the built-in type microphone 114 that inputs a sound, a built-in type speaker 115 that outputs a sound, an audio input/output I/F 116 that processes an input/output of an audio signal between the microphone 114 and the speaker 115 according to control of the CPU 101, a display I/F 117 that transmits image data to the external display 120 according to control of the CPU 101, the external device connection I/F 181 that connects various external devices, the alarm lamp 119 that notifies failure of various functions of the terminal 10, and a bus line 110 such as an address bus and data bus for electrically connecting the above-described configuration elements as illustrated in FIG. 2.

The display 120 is a display unit configured from a liquid crystal or an organic EL that displays an image of the object, an operation icon, and the like. Further, the display 120 is connected to the display I/F 117 with a cable 120c. This cable 120c may be a cable for an analog RGB (VGA) signal, a cable for component video, or a cable for high-definition multimedia interface (HDMI) or a digital video interactive signal (DVI).

The camera 112 includes a lens and a solid image pickup device that converts an image (picture) of the object into an electronic form by converting light into an electric charge, and a complementary metal oxide semiconductor (CMOS), a charge coupled device (CCD), or the like is used as the solid image pickup device.

Each of external devices including an external camera, an external microphone, and an external speaker is electrically connectable to the external device connection I/F 181 with a universal serial bus (USB) cable inserted to the connection port 1132 of the housing 1100 illustrated in FIG. 4. When the external camera is connected, the external camera is driven in preference to the built-in type camera 112 according to driving of the CPU 101. Similarly, when the external microphone is connected and when the external speaker is connected, the external microphone and the external speaker are driven in preference to the built-in type microphone 114 and the built-in type speaker 115, respectively, according to control of the CPU 101.

Note that the recording medium 106 is freely detachable to the terminal 10. In addition, not only the flash memory 104, but also electrically erasable and programmable ROM (EEPROM) or the like can be used as long as it is non-volatile memory that reads/writes data according to control of the CPU 101.

Further, the above-described terminal program may be distributed by being recorded on a recording medium (recording medium 106 and the like) readable by a computer in an installable or executable format file. Alternatively, the above-described terminal program may be stored in the ROM 102 instead of the flash memory 104.

Figure 3:
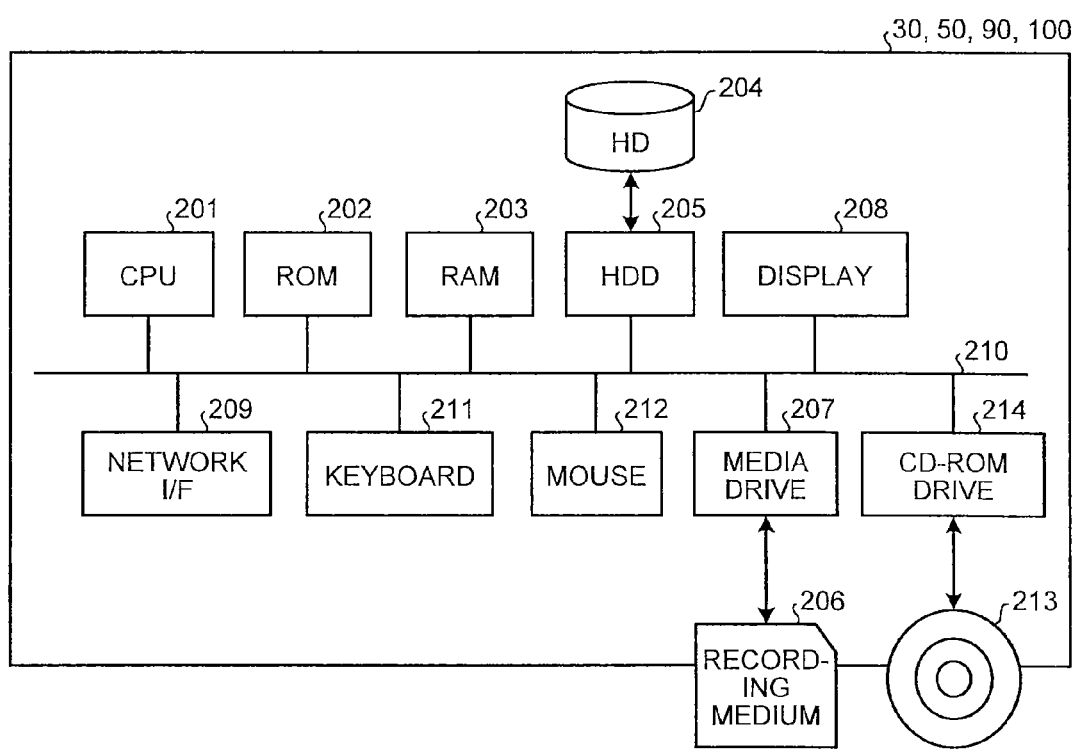
FIG. 3 is a hardware configuration diagram of a transmission management system, a relay device, a program providing system, and a maintenance system.

FIG. 3 is a hardware configuration diagram of a management system according to an embodiment of the present invention. The management system 50 includes a CPU 201 that controls an operation of the entire management system 50, a ROM 202 that stores a transmission management program, a RAM 203 used as a work area of the CPU 201, a hard disk (HD) 204 that stores various types of data, a hard disk drive (HDD) 205 that controls reading/writing of various types of data to/from the HD 204 according to control of the CPU 201, a media drive 207 that controls reading/writing (storing) of data to/from the recording medium 206 such as flash memory, a display 208 that displays various types of information such as a cursor, a menu, a window, a letter, and an image, a network I/F 209 for transmitting data using the communication network 2 described below, a keyboard 211 provided with a plurality of keys for inputting a letter, a numerical value, various instructions, and the like, a mouse 212 that performs selection and execution of various instructions, selection of an object to be processed, moving of the cursor, and the like, a CD-ROM drive 214 that controls reading/writing of data to/from a compact disc read only memory (CD-ROM) 213 as an example of the detachable recording medium, and a bus line 210 such as an address bus and a data bus for electrically connecting the above-described configuration elements as illustrated in FIG. 3.

Note that the above-described transmission management program may be distributed by being recorded on a recording medium readable by a computer such as the recording medium 206 and the CD-ROM 213 in an installable or executable format file.

The relay device 30 has similar hardware configuration to the management system 50, and therefore, description thereof is omitted. Note that the ROM 202 stores a relay device program for controlling the relay device 30. In this case, the relay device program may be also distributed by being recorded on a recording medium readable b a computer such as the recording medium 206 and the CD-ROM 213 in an installable or executable format file.

Further, the program providing system 90 has a similar hardware configuration to the management system 50, and therefore description thereof is omitted. Note that the ROM 202 stores a program providing program for controlling the program providing system 90. In this case, the program providing program may also be distributed by being recorded on a recording medium readable by a computer such as the recording medium 206 and the CD-ROM 213 in an installable or executable format file.

Further, the maintenance system 100 has a similar hardware configuration to the management system 50, and therefore description thereof is omitted. Note that the ROM 202 stores a maintenance program for controlling the maintenance system 100. In this case, the maintenance program may also be distributed by being recorded on a recording medium readable by a computer such as the recording medium 206 and the CD-ROM 213 in an installable or executable format file.

Note that, as another example of the detachable recording medium, it may be configured such that the detachable recording medium is provided by being recorded on a recording medium readable by a computer such as a compact disc recordable (CD-R), a digital versatile disk (DVD), and a Blu-ray disc.

Function Configuration of Embodiment

Figure 5:
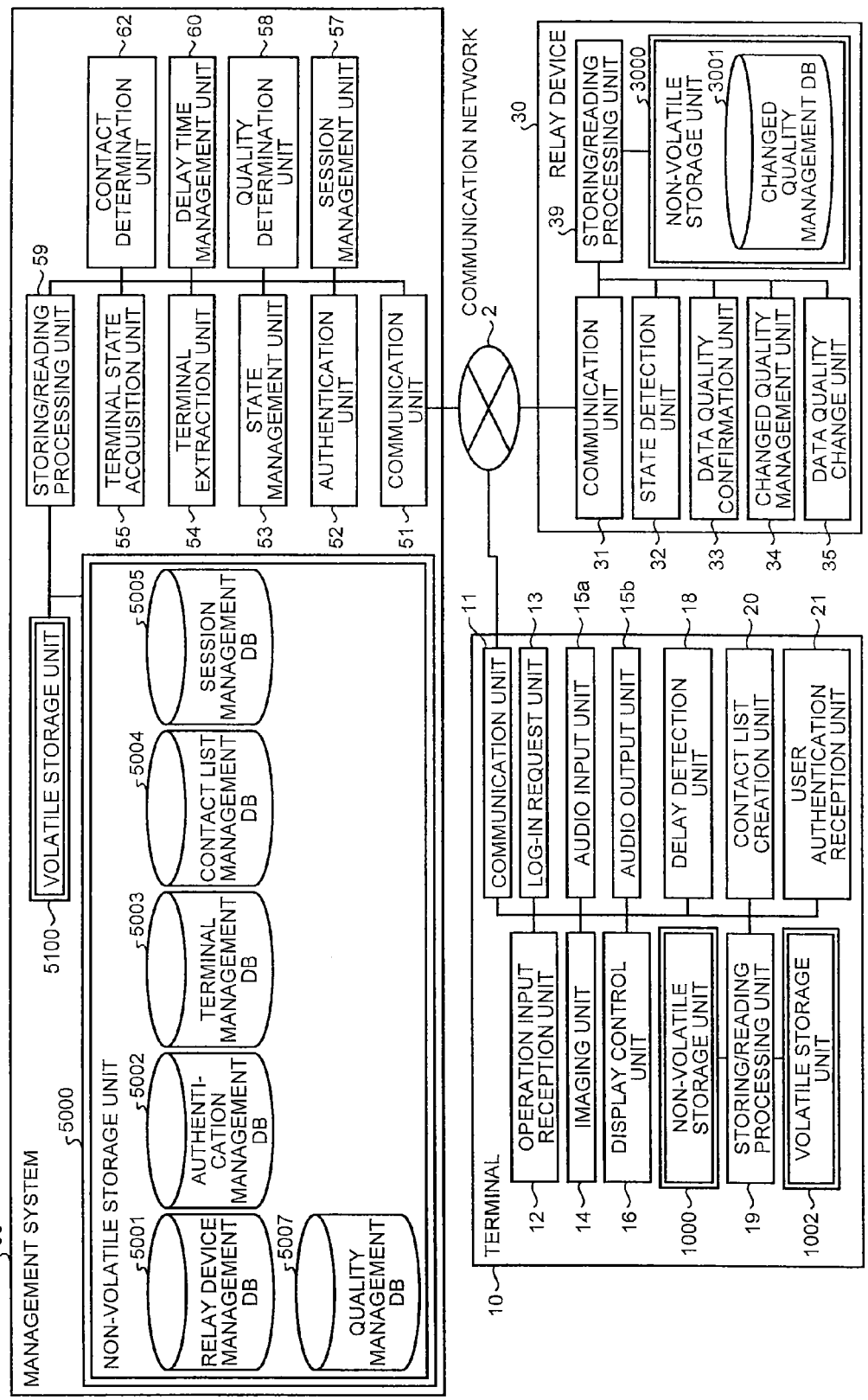
FIG. 5 is a function block diagram of terminals, devices, and systems that configure the transmission system.

Next, a function configuration of the present embodiment will be described. FIG. 5 is a function block diagram of terminals, devices, and systems that configure the transmission system 1 of the present embodiment. In FIG. 5, the terminal 10, the relay device 30, and the management system 50 are connected so as to perform data communication through the communication network 2. The program providing system 90 and the maintenance system 100 illustrated in FIG. 1 are not directly relevant to communication of a television conference, and therefore, they are omitted in FIG. 5.

Function Configuration of Terminal

The terminal 10 includes a communication unit 11, an operation input reception unit 12, a log-in request unit 13, an imaging unit 14, an audio input unit 15a, an audio output unit 15b, a display control unit 16, a delay detection unit 18, a storing/reading processing unit 19, a user authentication reception unit 21, and a contact list creation unit 20. These units are functions or means realized by operation of any of the configuration elements illustrated in FIG. 2 by an instruction from the CPU 101 according to a program stored in the ROM 102. In addition, the terminal 10 includes a volatile storage unit 1002 built by the RAM 103 illustrated in FIG. 2 and a non-volatile storage unit 1000 built by the flash memory 104 illustrated in FIG. 2.

Function Units of Terminal

Next, units of the terminal 10 will be described in detail. The communication unit 11 of the terminal 10 is realized by the network I/F 111 illustrated in FIG. 2, and performs transmission/reception of various types of data (or information) with other terminals, devices, or systems through the communication network 2.

The communication unit 11 starts reception of each state information that indicates a state of each terminal 10 as a contact terminal candidate from the management system 50 before an appropriate terminal 10 establishes a session with another terminal 10, and starts a television conference by a telephone call.

Here, the contact terminal candidate is a partner with which the appropriate terminal 10 conducts the television conference, that is, a terminal 10 that can be designated as a session partner. That is, the appropriate terminal 10 cannot establish a session with a terminal that has not been set as the contact terminal candidate in advance, and therefore cannot conduct the television conference. Note that the contact terminal candidate is a candidate of a partner terminal that conducts the television conference, that is, a partner terminal candidate.

Note that the state information indicates an operation state (a state of an ON line or an OFF line) of each terminal 10, and indicates, in the ON line, a detailed state (hereinafter, referred to as a communication state) such as whether during a telephone call or during standby. In addition, this state information not only indicates the operation state and the communication state of each terminal 10 but also indicates various states including: a cable is disconnected from the terminal 10, a sound can be output but an image cannot be output, the terminal is set not to output a sound (mute), and the like. Hereinafter, a case in which the state information indicates the operation state and the communication state will be described as an example.

When the appropriate terminal 10 operates as a start request terminal, the communication unit 11 transmits the start request information to the management system 50. Here, the start request information is information requesting start of a session used in a television conference. To be specific, the start request information includes information indicating requesting start, a terminal ID of the start request terminal that is a transmission source of the start request information, and a terminal ID that identifies a contact terminal that is a partner of the session. Note that the terminal ID is information for identifying the terminal 10.

The user authentication reception unit 21 receives authentication information of a user input with the authentication reception I/F 118.

The operation input reception unit 12 is realized by the operation button 108 and the power switch 109 illustrated in FIG. 2, and receives various inputs by the user. For example, when the user turns ON the power switch 109 illustrated in FIG. 2, the operation input reception unit 12 illustrated in FIG. 5 receives the power source ON, and turns ON the power source.

The log-in request unit 13 is realized by an instruction from the CPU 101 illustrated in FIG. 2, and the communication unit 11 automatically transmits, to the management system 50 through the communication network 2, log-in request information indicating requesting a log-in and a current IP address of the appropriate terminal 10 using the reception of the power source ON as a trigger. When the user turns the power switch 109 from the ON state to the OFF state, the communication unit 11 transmits the state information indicating turning OFF the power source to the management system 50, and then the operation input reception unit 12 turns OFF the power source completely. Accordingly, the management system 50 side can grasp the terminal 10 is turned from the power source ON to the power source OFF.

The imaging unit 14 is realized by an instruction from the CPU 101, the camera 112, and the image pickup device I/F 113 illustrated in FIG. 2, and images an object and outputs image data obtained by the imaging. The audio input unit 15a is realized by the audio input/output I/F 116 illustrated in FIG. 2, and, after a voice of the user is converted into an audio signal by the microphone 114, the audio input unit 15a inputs audio data regarding the audio signal. The audio output unit 15b is realized by an instruction from the CPU 101 and the audio input/output I/F 116 illustrated in FIG. 2, and outputs an audio signal regarding the audio data to the speaker 115 and causes the speaker 115 to output a sound.

The display control unit 16 is realized by the display I/F 117 illustrated in FIG. 2, and performs control for transmitting image data to the external display 120. The display control unit 16 reflects the state information received after start of reception by the communication unit 11, and displays a contact list including contact names on the display 120 before the terminal 10 as a request source starts a telephone call of a television conference with the terminal 10 as a desired contact.

The delay detection unit 18 is realized by an instruction from the CPU 101 illustrated in FIG. 2, and detects a delay time (ms) of image data or audio data transmitted from another terminal 10 through the relay device 30.

The storing/reading processing unit 19 is realized by an instruction from the CPU 101 illustrated in FIG. 2 and by the SSD 105 illustrated in FIG. 2 as an example, and performs processing of storing various types of data in the non-volatile storage unit 1000 and reading the various types of data stored in the non-volatile storage unit 1000. This non-volatile storage unit 1000 stores a terminal identification (ID) for identifying a terminal 10, a password, and the like. Further, the storing/reading processing unit 19 performs processing of storing various types of data in the volatile storage unit 1002, and reading the various types of data stored in the volatile storage unit 1002. This volatile storage unit 1002 overwrites and stores content data received every time a telephone call with the contact terminal is performed. Among the content data, an image is displayed on the display 120 with the image data before overwriting, and a sound is output from the speaker 115 with the audio data before overwriting.

Figure 10:
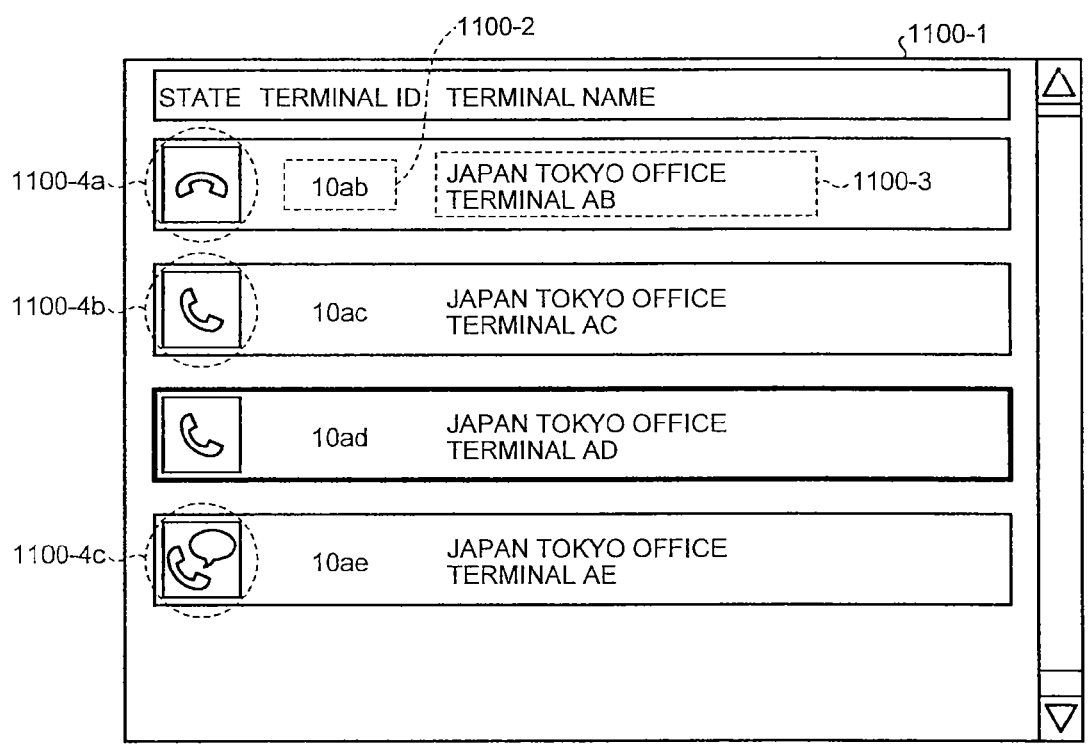
FIG. 10 is a diagram illustrating a display example of a contact list.

The contact list creation unit 20 creates and updates the contact list as illustrated in FIG. 10, in which the states of the contact candidates are illustrated by icons based on contact list information described below and the state information of the terminals 10 as the contact candidates described below received from the management system 50.

Especially, in the present embodiment, under a state where the terminal 10 has logged in to the management system 50, and under a state where the contact list according to the terminal 10 is being displayed on the display 120, when the user who uses the terminal 10 inputs the authentication information to the authentication reception I/F 118 and receives the contact list information from the management system 50 according to the user the contact list creation unit 20 creates the contact list about the user from the contact list information of the user. Therefore, the display control unit 16 updates the display of the contact list about the terminal 10 on the display 120 to display of the newly created contact list about the user.

In addition, under a state where the user has logged in to the management system 50, and under a state where the contact list according to the user is being displayed on the display 120, when another user using the terminal 10 inputs the authentication information to the authentication reception I/F 118, and when the contact list information according to the another user is received from the management system 50, the contact list creation unit 20 creates the contact list about the another user from the contact list information of the another user. Therefore, the display control unit 16 updates the display of the contact list about the first user on the display 120 to the newly created contact list about the another user.

(Function Configuration of Relay Device)

Next, functions or means of the relay device 30 will be described. The relay device 30 includes a communication unit 31, a state detection unit 32, a data quality confirmation unit 33, a changed quality management unit 34, a data quality change unit 35, and a storing/reading processing unit 39. The each unit is a function or a means realized by operation of any of the configuration elements illustrated in FIG. 3 by an instruction from the CPU 201 according to the program stored in the ROM 202. In addition, the relay device 30 is built by the HD 204 illustrated in FIG. 3, and includes a non-volatile storage unit 3000 that maintains various types of data and information stored therein even if the power source of the relay device 30 is turned OFF.

In the non-volatile storage unit 3000, a changed quality management data base (DB) 3001 is built with a changed quality management table. Note that, in the changed quality management table, an IP address of the terminal 10 as a relay contact of image data and image quality of the image data to be relayed to the relay contact by the relay device 30 are managed by being associated with each other.

Function Units of Relay Device

Next, functional configurations of the relay device 30 will be described in detail. Note that, hereinafter, in describing units of the relay device 30, relationships between the units and main configuration elements for realizing the units of the relay device 30 from among the configuration elements illustrated in FIG. 3 will be also described.

The communication unit 31 of the relay device 30 illustrated in FIG. 5 is realized by the network I/F 209 illustrated in FIG. 3, and performs transmission/reception of various types of data (or information) with other terminal, device or system through the communication network 2. The state detection unit 32 is realized by an instruction from the CPU 201 illustrated in FIG. 3, and detects an operation state of the relay device 30 that includes the state detection unit 32. The operation state includes an "ON line", an "OFF line", and "out of order".

The data quality confirmation unit 33 is realized by an instruction from the CPU 201 illustrated in FIG. 3, and searches the changed quality management table using the IP address of the contact terminal as a search key and extracts image quality of corresponding image data to be delayed to confirm the image quality of the image data to be relayed. The changed quality management unit 34 is realized by an instruction from the CPU 201 illustrated in FIG. 3, and changes content of the changed quality management table in the changed quality management DB 3001 based on quality information transmitted from the management system 50.

The data quality change unit 35 is realized by an instruction from the CPU 201 illustrated in FIG. 3, and changes the image quality of the image data transmitted from the terminal 10 as a transmission source based on the changed content of the changed quality management table in the changed quality management DB 3001. The storing/reading processing unit 39 is realized by the HDD 205 illustrated in FIG. 3, and performs processing of storing various types of data in the non-volatile storage unit 3000 and reading the various types of data stored in the non-volatile storage unit 3000.

Function Configuration of Management System

Next, functions and means of the management system 50 will be described. The management system 50 includes a communication unit 51, an authentication unit 52, a state management unit 53, a terminal extraction unit 54, a terminal state acquisition unit 55, a session management unit 57, a quality determination unit 58, a storing/reading processing unit 59, a delay time management unit 60, and a contact determination unit 62. The each unit is a function or a means realized by operation of any of the configuration elements illustrated in FIG. 3 by an instruction from the CPU 201 according to the program stored in the ROM 202. In addition, the management system 50 is built by the HD 204 illustrated in FIG. 3, and includes a non-volatile storage unit 5000 that maintains various types of data and information stored therein even if the power source of the management system 50 is turned OFF. Various types of information are stored in the non-volatile storage unit 5000. Further, the management system 50 includes a volatile storage unit 5100 built by the RAM 203 illustrated in FIG. 3.

(Relay Device Management Table)

A relay device management DB 5001 configured from a relay device management table is built in the non-volatile storage unit 5000. For each relay device ID that identifies each relay device 30, the operation state of the relay device 30, a date and time of reception at which the state information indicating the operation state is received by the management system 50, the IP address of the relay device 30, and a maximum data transmission rate (Mbps) in the relay device 30 are managed by being associated with each other in the relay device management table.

(Authentication Management Table)

Further, an authentication management DB 5002 configured from the authentication management table illustrated in FIG. 6 is built in the non-volatile storage unit 5000. Note that FIG. 6 is a concept diagram illustrating the authentication management table. In the authentication management table, passwords are associated with terminal IDs of all terminals 10 managed by the management system 50 and user IDs of all users who use the terminals 10, and the passwords and the IDs are managed. Here, the terminal ID is information identifying the terminal 10, and the user ID is information identifying the user. The password is information used for authenticating the terminal 10 or the user. Here, the terminal ID and the user ID are collectively referred to as IDs. For example, the authentication management table illustrated in FIG. 6 indicates that the password of a terminal or a user having an ID "10*aa*" is "aaaa".

Note that the IDs in the present embodiment respectively indicate identification information, such as language, letters, marks, or various symbols, used for uniquely identifying the terminal 10 or the user. In addition, the IDs may be identification information in which at least two from the language, letters, marks and various symbols are combined.

(Terminal Management Table)

A terminal management DB 5003 configured from a terminal management table illustrated in FIG. 7 is built in the non-volatile storage unit 5000. Note that FIG. 7 is a concept diagram illustrating the terminal management table. For each terminal ID of each terminal 10 from among the IDs, a terminal name, an operation state of the terminal 10, a date and time of reception at which log-in request information described below is received by the management system 50, and the IP address of the terminal 10 are managed by being associated with each other in the terminal management table.

Here, the operation state includes an ON line that is a state in which the power source is turned on and communication is possible or during communication, and an OFF line that is a state in which the communication is not possible because the power source is not turned on or the like.

For example, the terminal management table illustrated in FIG. 7, the terminal 10*aa* having the terminal ID "10*aa*" is indicated such that the terminal name is "Japan Tokyo office terminal AA", the operation state is the "ON line (telephone call is possible)", the date and time at which the log-in request information is received by the management system 50 is "13:40 of Nov. 10, 2009", and the IP address of the terminal 10*aa* is "1.2.1.3".

(Contact List Management Table)

Further, a contact list management DB 5004 configured from the contact list management table illustrated in FIG. 8 is built in the non-volatile storage unit 5000. Note that FIG. 8 is a concept diagram illustrating the contact list management table. In this contact list management table, the ID of the start request terminal that is a terminal 10 as a request source of the start request information of a session used in a television conference including a telephone call managed by the management system 50, and the IDs such as the terminal ID identifying a contact terminal candidate that is a terminal 10 serving as a contact candidate that receives content data transmitted from the terminal 10 as the request source, and the user ID of a user who uses the terminal are managed by being associated with each other. For example, the contact list management table illustrated in FIG. 8 indicates that the contact terminal candidate to which the terminal (terminal 10*aa*) having the terminal ID of "10*aa*" can request start of a television conference is an terminal 10*ab* having the terminal ID of "10*ab*", a terminal 10*ac* having the terminal ID of "10*ac*", a terminal 10*ad* having the terminal ID of "10*ad*", and a terminal 10*ae* having the terminal ID of "10*ae*". This contact terminal candidate is updated by being added or deleted by a request of addition or deletion from the start request terminal to the management system 50.

(Session Management Table)

In addition, in a session management table that configures a session management DB 5005 built in the non-volatile storage unit 5000, for each session ID for identifying a session in which content data is transmitted among terminals, a relay device ID of the relay device 30 used for relaying the content data in the session, the terminal ID of the start request terminal that is a transmission source of the start request information of the session, the terminal ID of the contact terminal specified as a partner in the start request information of the session, a delay time (ms) of reception when image data is received by the contact terminal, and a date and time of reception at which the delay information indicating the delay time is transmitted from the contact terminal and received by the management system 50 are managed by being associated with each other.

(Quality Management Table)

Further, a quality management DB 5007 configured from the quality management table is built in the non-volatile storage unit 5000. In this quality management table, the image quality of image data to be relayed by the relay device 30 and a delay time (ms) of the image data in the start request terminal or in the contact terminal are managed by being associated with each other.

(Function Units of Management System)

Next, function units of the management system 50 will be described in detail. Note that, hereinafter, in describing units of the management system 50, relationships between the units and main configuration elements for realizing the units of the management system 50 from among the configuration elements illustrated in FIG. 3 will be also described.

The communication unit 51 is executed by the network I/F 209 illustrated in FIG. 3, and performs transmission/reception of various types of data (or information) with other terminal, device, or system through the communication network 2. The authentication unit 52 performs authentication of the terminal 10 or the user by searching the authentication management table (see FIG. 6) in the non-volatile storage unit 5000 using the terminal ID or the password included in the log-in request information received through the communication unit 51 as a search key, and by determining whether the same ID and password are managed in the authentication management table.

The state management unit 53 manages an operation state of the terminal management table illustrated in FIG. 7. To manage the operation state of the terminal 10 (log-in request terminal) that has requested log-in, the state management unit 53 stores and manages, in the terminal management table (see FIG. 7), the terminal ID of the log-in request terminal, the operation state of the log-in request terminal, a date and time of reception at which the log-in request information is received by the management system 50, and the IP address of the log-in request terminal in association with each other. The state management unit 53 sets the operation state that indicates the OFF line of the terminal management table (see FIG. 7) to the ON line based on information indicating the power source is to be turned ON transmitted from the terminal 10 by the user of the terminal 10 turning ON the power switch 109 of the terminal 10 from the OFF state. Further, the operation state that indicates the ON line of the terminal management table (see FIG. 7) is set to the OFF line based on information indicating the power source is to be turned OFF transmitted from the terminal 10 by the user turning OFF the power switch 109 of the terminal 10 from the ON state.

When change request information transmitted from the start request terminal of the start request information of a television conference or the contact terminal is received by the communication unit 51, the state management unit 53 appropriately changes at least one of the start request terminal and the contact terminal in the terminal management table (see FIG. 7) based on the change request information.

The terminal extraction unit 54 extracts a terminal ID by searching the contact list management table (see FIG. 8) using the terminal ID of an object terminal or the user ID of the user that serves as an object to be processed such as the terminal 10 or the user that has requested log-in, that is, using the ID as a search key, and reading out the terminal ID of a contact terminal candidate that can perform a telephone call with the object terminal, that is, a candidate that can establish a session with the object terminal. To be specific, the terminal extraction unit 54 reads out the terminal ID of the contact terminal candidate in association with the terminal ID of the start request terminal, which coincides with an object ID in the contact list management table (see FIG. 8).

In addition, the terminal extraction unit 54 searches the contact list management table using the ID of the object terminal as a key, and extracts terminal IDs of other terminals 10 that registers the ID of the object terminal as the contact terminal candidate. To be specific, the terminal extraction unit 54 reads out the terminal ID of the start request terminal in association with the terminal ID of the contact terminal candidate, which coincides with the ID of the object terminal in the contact list management table (see FIG. 8).

The terminal state acquisition unit 55 searches the terminal management table (see FIG. 7) using the ID as a search key, and reads out the operation state for each ID. Accordingly, the terminal state acquisition unit 55 can obtain the operation state of the contact terminal candidate that can make a telephone call with the terminal 10 that has requested log-in. In addition, the terminal state acquisition unit 55 searches the terminal management table, and acquires the operation state of the terminal that has requested log-in request.

The session management unit 57 stores and manages, in the session management table in the non-volatile storage unit 5000, a session ID generated in a session ID creation unit (not illustrated), the terminal ID of the request source terminal, and the terminal ID of the contact terminal in association with each other. In addition, the session management unit 57 stores and manages the relay device ID of a finally selected relay device 30 in the session management table for each session ID.

The quality determination unit 58 determines the image quality of image data to be relayed by the relay device 30 by searching the quality management table using the delay time as a search key, and extracting the image quality of corresponding image data. The storing/reading processing unit 59 is executed by the HDD 205 illustrated in FIG. 3, and performs processing of storing various types of data in the non-volatile storage unit 5000, or reading the various types of data stored in the non-volatile storage unit 5000. In addition, the storing/reading processing unit 59 also performs processing of storing various types of data in the volatile storage unit 5100, and reading the various types of data stored in the volatile storage unit 5100.

The delay time management unit 60 searches the terminal management table (see FIG. 7) using the IP address of the contact terminal as a search key to extract a corresponding terminal ID, and further, stores and manages a delay time indicated in the delay information in a field part of a delay time in a record that includes the extracted terminal ID in the session management table.

The contact determination unit 62 refers to the contact list management table (see FIG. 8), and determines whether the contact terminal ID of the terminal 10 that requests participation is included in the contact terminal IDs of the terminal 10 extracted by the terminal extraction unit 54, the terminal 10 being participating in a content data session sed.

Processing/Operation of Embodiment

Figure 9:
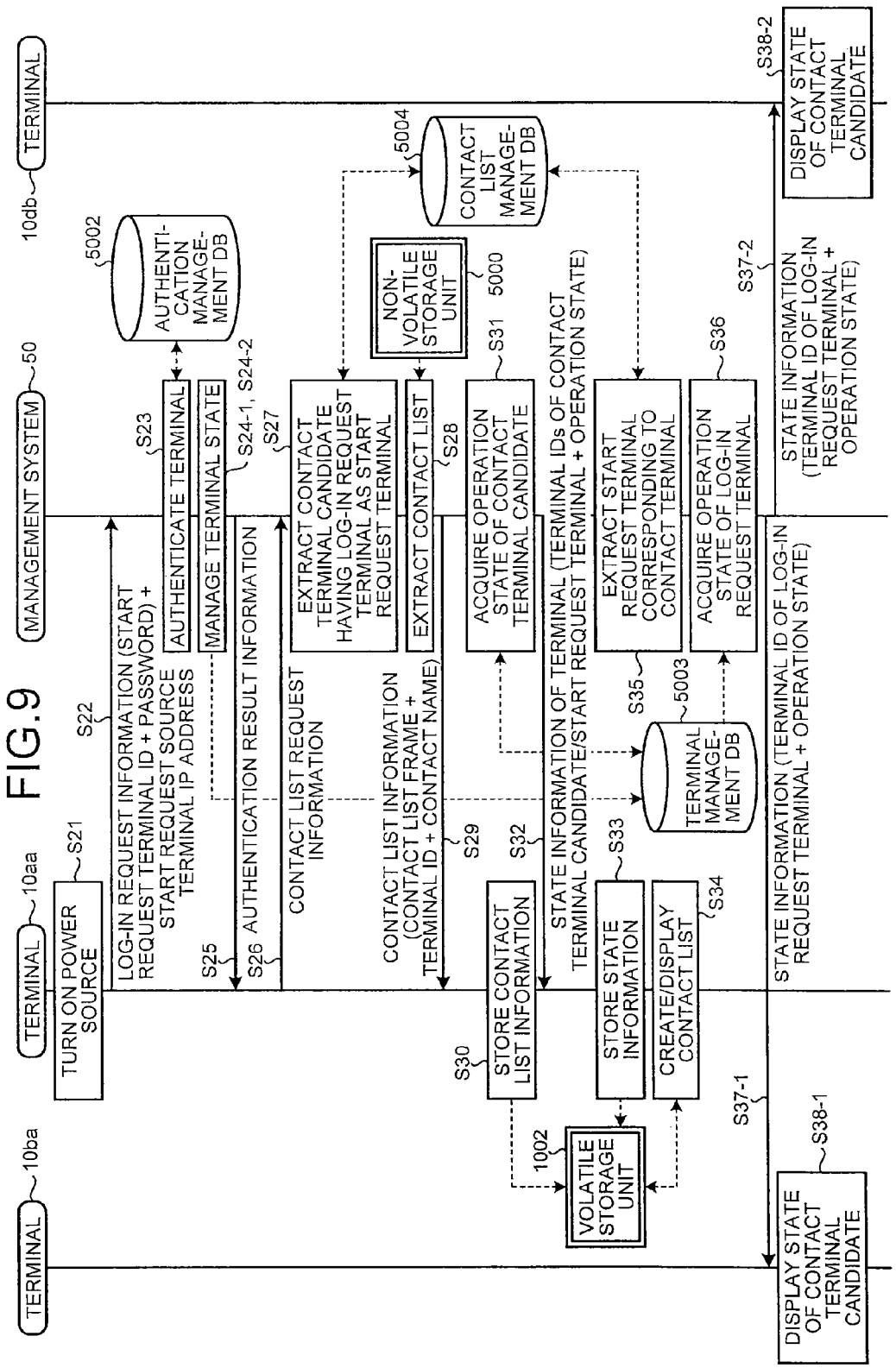
FIG. 9 is a sequence diagram illustrating processing of a preparation stage in which a telephone call is started between transmission terminals.

The above is description of the configurations and functions (or means) of the transmission system 1 according to the present embodiment. Following that, a processing method in the transmission system 1 according to the present embodiment will be described. Processing of transmitting/receiving management information in a preparation stage before the terminal 10aa starts a telephone call will be described with reference to FIG. 9. FIG. 9 is a sequence diagram illustrating processing of the preparation stage in which a telephone call is started between terminals. Note that FIG. 9 illustrates processing in which various types of management information are all transmitted/received in a management information session sei.

First, when the user of the terminal 10aa turns ON the power switch 109 illustrated in FIG. 2, the operation input reception unit 12 illustrated in FIG. 5 receives the power source ON and turns ON the power source (step S21). Then, the log-in request unit 13 automatically transmits log-in request information indicating a log-in request to the management system 50 from the communication unit 11 through the communication network 2 using the reception of the power source ON as a trigger (step S22). This log-in request information includes a terminal ID and a password for identifying the terminal 10aa that is an own terminal as a request source. These terminal ID and password are data read out from the non-volatile storage unit 1000 through the storing/reading processing unit 19 and transmitted to the communication unit 11. Note that, when the log-in request information is transmitted from the terminal 10aa to the management system 50, the management system 50 at a reception side can grasp the IP address of the terminal 10aa at a transmission side.

Next, the authentication unit 52 of the management system 50 performs terminal authentication by searching the authentication management table (see FIG. 6) in the non-volatile storage unit 5000 using the terminal ID and the password included in the log-in request information received through the communication unit 51, and determining whether the same ID and password are managed in the authentication management DB 5002 (step S23).

Since the same ID and password are managed by the authentication unit 52, when it is determined that a log-in request is from the terminal 10aa having valid use authority, the state management unit 53 stores a date and time of reception at which the log-in request information is received and the IP address of the terminal 10aa in association with each other in the terminal management table (see FIG. 7) for each record indicated by the terminal ID of the terminal 10aa and the terminal name (step S24-1). Accordingly, in the terminal management table illustrated in FIG. 7, the terminal ID "10aa" and the date and time of reception "2009.11.10.13:40" and the terminal IP address "1.2.1.3" in association with each other.

Following that, the state management unit 53 sets the operation state "ON line" of the terminal 10aa, and stores the operation state and each record indicated by the terminal ID of the terminal 10aa and the terminal name in the terminal management table in association with each other (see FIG. 7) (step S24-2). Accordingly, in the terminal management table illustrated in FIG. 7, the terminal ID "10aa" and the operation state "ON line" are managed in association with each other.

Then, the communication unit 51 of the management system 50 transmits authentication result information indicating an authentication result obtained by the authentication unit 52 to the log-in request terminal (terminal 10aa) that has requested log-in through the communication network 2 (step S25). In the present embodiment, a case in which it is determined by the authentication unit 52 that a terminal is one having valid use authority will be herein described.

In the terminal 10aa, when the authentication result information indicating a result in which the terminal is determined to be one having valid use authority is received, the communication unit 11 transmits contact list request information indicating a request of the contact list to the management system 50 through the communication network 2 (step S26). Accordingly, the communication unit 51 of the management system 50 receives the contact list request information.

Next, the terminal extraction unit 54 extracts the terminal ID by searching the contact list management table (see FIG. 8) using the terminal ID "10aa" of the log-in request terminal (terminal 10aa) that has requested log-in, and reading out the terminal ID of the contact terminal candidate with which the log-in request terminal (terminal 10aa) can make a telephone call as a start request terminal, that is, the candidate with which the log-in request terminal can establish a session (step S27). In addition, the terminal extraction unit 54 extracts the terminal name by searching the terminal management table (see FIG. 7) using the extracted terminal ID as a search key, and reading out the terminal name corresponding to the terminal ID, that is, the terminal name of the contact terminal candidate. Here, respective terminal IDs ("10ab", "10ac", "10ad", and "10ae") of the contact terminal candidates (terminal (10ab, 10ac, 10ad, and 10ae)) corresponding to the terminal ID "10aa" of the start request terminal (terminal 10aa) and the terminal names ("Japan Tokyo office terminal AB" and the like) corresponding thereto are extracted.

Next, the communication unit 51 of the management system 50 reads out data of a contact list frame (data of a part of the contact list frame 1100-1 illustrated in FIG. 10) from the non-volatile storage unit 5000 through the storing/reading processing unit 59 (step S28), and transmits the contact list frame and the "contact list information (contact list frame, terminal ID, terminal name)" including the terminal ID and the terminal name of the contact terminal candidate extracted by the terminal extraction unit 54 to the start request terminal (terminal 10aa) (step S29). Accordingly, in the start request terminal (terminal 10aa), the communication unit 11 receives the contact list information, and the storing/reading processing unit 19 stores the contact list information in the volatile storage unit 1002 (step S30).

In this way, in the present embodiment, each terminal 10 does not manage the contact list information, and the management system 50 unitarily manages the contact list information of all terminals 10. Therefore, even in a case where a new terminal 10 is included in the transmission system 1, a new model terminal 10 is included in place of the already included terminal 10, or the appearance of the contact list frame and the like are changed, the management system 50 side collectively deals with the information, and can therefore save the effort of changing the contact list information at the terminal 10 side.

In addition, the terminal state acquisition unit 55 of the management system 50 acquires each operation state of the terminals (10ab, 10ac, 10ad, and 10ae) as the contact terminal candidates by searching the terminal management table (see FIG. 7) using each of the terminal IDs ("10ab", "10ac", "10ad", and "10ae") of the contact terminal candidates extracted by the terminal extraction unit 54 as a search key, and reading out a corresponding operation state for each terminal ID extracted by the terminal extraction unit 54 (step S31).

Next, the communication unit 51 transmits the terminal ID as a search key used in step S31 and the state information including the operation state of corresponding contact terminal candidate to the log-in request terminal through the communication network 2 (step S32). To be specific, at step S32, the state information including the terminal ID "10ab" as a search key and the operation state "OFF line" of the contact terminal candidate (terminal 10ab) is transmitted to the log-in request terminal (terminal 10aa). Note that, when the operation state is the "OFF line", the communication state is not included in the state information. In addition, similarly, as a part of step S32, the communication unit 51 transmits each state information of all contact terminal candidates, which is the state information including the terminal ID "10ac" and the operation state "ON line" of the corresponding contact terminal candidate (terminal 10ac), to the log-in request terminal (terminal 10aa).

Next, the storing/reading processing unit 19 of the log-in request terminal (terminal 10aa) sequentially stores the state information received from the management system 50 in the volatile storage unit 1002 (step S33). Therefore, the log-in request terminal (terminal 10aa) can acquire the current operation states of the terminal 10ab and the like that are the contact terminal candidates that can make a telephone call with the log-in request terminal (terminal 10aa) as the start request terminal by receiving the state information of the terminals.

Next, the contact list creation unit 20 of the log-in request terminal (terminal 10aa) creates the contact list in which the operation states of the terminals 10 as the contact terminal candidates have been reflected based on the contact list information stored in the volatile storage unit 1002 and the state information of the terminals. The display control unit 16 then displays the contact list on the display 120aa illustrated in FIG. 1 at a predetermined timing (step S34).

FIG. 10 is a diagram illustrating a display example of the contact list. As illustrated in FIG. 10, the contact list is a display screen including a terminal ID 1100-2 and a terminal name 1100-3 of the contact terminal candidate, icons 1100-4a to 1100-4c that reflect the state information, and the like in the contact list frame 1100-1.

As the icons, there are an OFF-line icon 1100-4a that indicates a telephone call cannot be conducted because of the OFF line, a telephone-call-possible icon 1100-4b that indicates a telephone call is possible in the ON line, and a during-telephone-call icon 1100-4c that indicates during a telephone call in the ON line.

When the operation state of the contact terminal candidate is the "ON line", the contact list creation unit 20 allocates the telephone-call-possible icon 1100-4b or the during-telephone-call icon 1100-4c to the contact terminal candidate. It may be configured such that whether the telephone-call-possible icon 1100-4b or the during-telephone-call icon 1100-4c is determined by acquiring a telephone call state. When the operation state of the contact terminal candidate is the "OFF line", the contact list creation unit 20 allocates the OFF-line icon 1100-4a to the contact terminal candidate.

Meanwhile, referring back to FIG. 9, the terminal extraction unit 54 of the management system 50 searches the contact list management table (see FIG. 8) using the terminal ID "10aa" of the log-in request terminal (terminal 10aa) as a search key, and extracts the terminal ID of another terminal (start request terminal) that has registered the terminal ID "10aa" of the log-in request terminal (terminal 10aa) as the contact terminal candidate (step S35). In the contact list management table illustrated in FIG. 8, the terminal ID of the extracted another request source terminal is "10ab", "10ba", and "10db".

Next, the terminal state acquisition unit 55 of the management system 50 searches the terminal management table (see FIG. 7) using the terminal ID "10aa" of the log-in request terminal (terminal 10aa) as a search key, and obtains the operation state of the log-in request terminal (terminal 10aa) (step S36).

Then, the communication unit 51 transmits the state information including the terminal ID "10aa" of the log-in request terminal (terminal 10aa) and the operation state "ON line" obtained in step S36 to the terminals (here, it is assumed that the operation states of the terminals 10ba and 10db are the "ON line") in which the operation states is the "ON line" in the terminal management table (see FIG. 7) from among the terminals (10ab, 10ba, and 10db) regarding the terminal IDs ("10ab", "10ba", and "10db") extracted in step S35 (steps S37-1 and S37-2).

Next, the terminals 10ba and 10db display the state information of the contact terminal candidates on the display 120, respectively (steps S38-1 and S38-2). Note that, when transmitting the state information to the terminals (10ba and 10db), the communication unit 51 refers to the IP address of the terminal managed in the terminal management table illustrated in FIG. 7 based on the terminal IDs ("10ba" and "10db"). Accordingly, the terminal ID "10aa" and the operation state "ON line" of the log-in request terminal (terminal 10aa) can be transmitted to each of the terminals (terminals 10ba and 10db) that can make a telephone call with the log-in request terminal (terminal 10aa) as a contact.

Meanwhile, in another terminal 10, similarly to step S21, when the user turns ON the power switch 109 illustrated in FIG. 2, the operation input reception unit 12 illustrated in FIG. 5 receives the power source ON, and performs similar processing to the processing of steps S22 to S38-1 and S38-2, and therefore description thereof is omitted.

Note that, in the above-described processing, the terminal ID of the own terminal 10aa is authenticated in the terminal authenticated processing at step S23, and the contact terminal candidate of the terminal ID of the terminal 10aa is extracted at step S27. However, it may be configured such that a screen that prompts the user authentication is displayed immediately after start-up of the terminal 10aa, and the contact terminal candidate associated with the user ID of the user is extracted in accordance with an authentication result at step S27.

Next, a case in which display of the contact list is switched under a state in which the terminal 10aa has logged in to the management system 50 and the contact list is being displayed on the display 120 will be described.

In the terminal 10aa, the contact list as illustrated in FIG. 10 is displayed on the display 120. When the transmission terminal 10aa is a shared terminal that can be used by a plurality of users, it would appear that, in the contact list, contacts to which all of the users of the transmission terminal 10aa are more likely to perform transmission are collected.

However, depending on the user who uses the terminal 10aa, it would appear that a contact unique to the user exists, to which the user performs transmission, other than the shared contact. When such all contacts unique to the user are registered in the contact list management table illustrated in FIG. 9 as the shared contact of the terminal 10aa, the number of the contacts displayed on the contact list illustrated in FIG. 10 becomes large and complicated, and effort is required for searching for an object contact terminal.

Further, depending on the contact, there is a case in which the user does not wish to share the contact, and in such a case, it is inconvenient if such a contact is registered as the shared contact of the terminal 10aa. To remove the inconvenience, the present embodiment performs the user authentication and enables switching of the contact list in accordance with a result of the user authentication.

Figure 11:
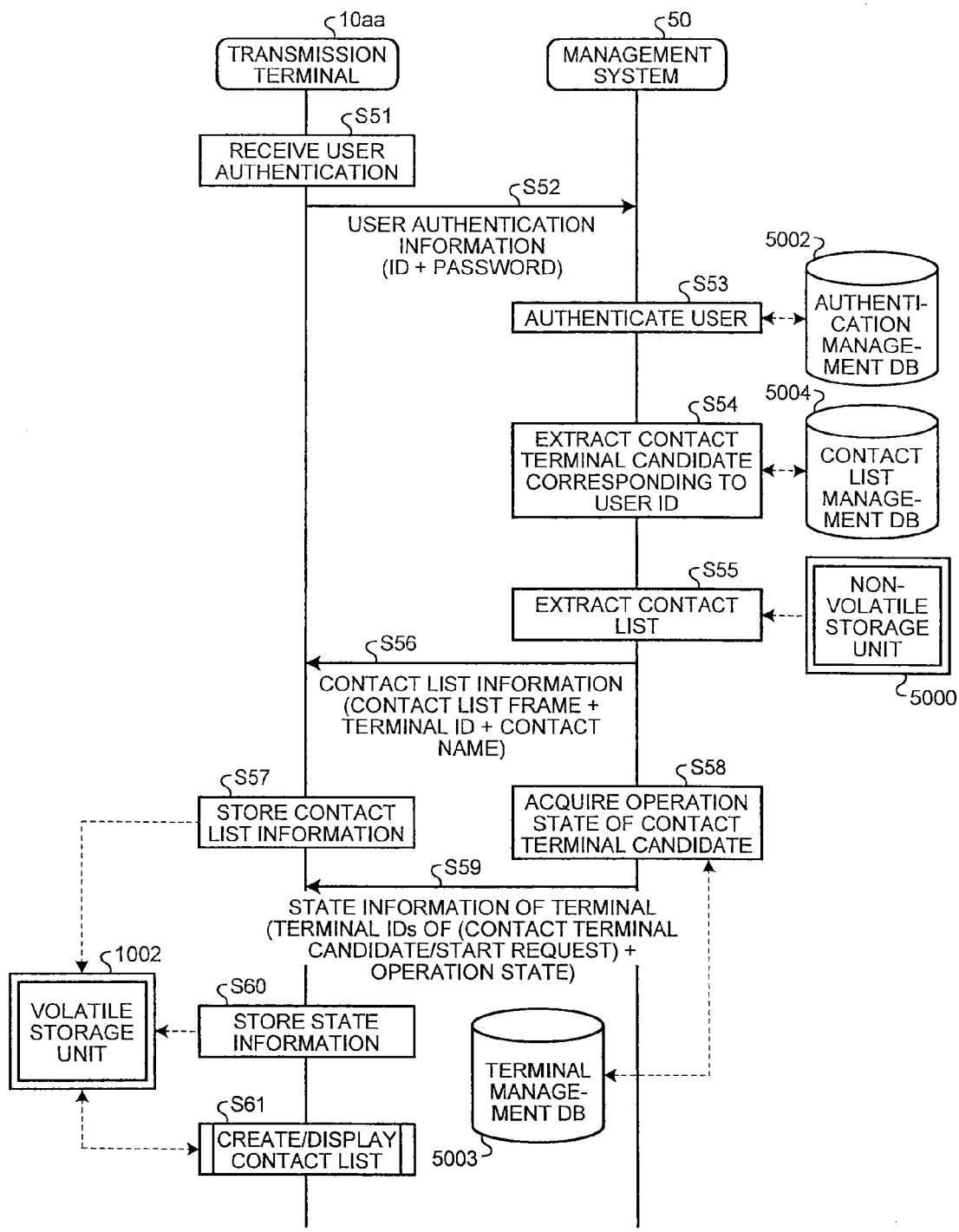
FIG. 11 is a sequence diagram illustrating a flow of processing of switching a display of a contact list in a first embodiment.

FIG. 11 is a sequence diagram illustrating processing of switching the display of the contact list in the first embodiment.

Under a state where the terminal 10aa logs in to the management system 50 and the contact list is displayed on the display 120, a user who wishes to switch the contact list from among the users who use the terminal 10aa causes the authentication reception I/F 118 of the terminal 10aa to read out the ID and the password that are the authentication information of the user, and the authentication reception I/F 118 reads out the authentication information of the user, and the user authentication reception unit 21 receives the input authentication information (step S51).

Here, when the authentication reception I/F 118 is an IC card reader, the user holds an IC including the authentication information, and when the authentication reception I/F 118 is a reader of an SD card or an SIM card, the user inserts the SD card or the SIM card including the authentication information into the reader, and the authentication reception I/F 118 reads out the authentication information, and the user authentication reception unit 21 receives the authentication information. Note that the authentication reception I/F 118 is not limited to the IC card reader or the reader of an SD card or an SIM card.

The communication unit 11 of the terminal 10aa then transmits the authentication information (the ID and the password) of the user to the management system 50 (step S52).

In the management system 50, the communication unit 51 receives the authentication information of the user from the terminal 10aa, and the authentication unit 52 checks the authentication information against the authentication management DB 5002, so that the user authentication is performed (step S53).

When the user authentication is succeeded, the terminal extraction unit 54 refers to the contact list management table of FIG. 8, and extracts the contact terminal candidate corresponding to the user ID (step S54). Then, when the contact candidate terminal is extracted, the communication unit 51 of the management system 50 reads out data of the contact list frame from the non-volatile storage unit 5000 through the storing/reading processing unit 59 (step S55), and transmits the "contact list information (the contact list frame, the terminal ID, and the terminal name)" including the contact list frame, and the terminal ID and the terminal name of the contact terminal candidate extracted by the terminal extraction unit 54 to the terminal 10aa (step S56).

Following processing (steps S57 to S61) are similarly performed to the processing from steps S30 to S34 illustrated in FIG. 9. That is, when having received the contact list information, the terminal 10aa stores the information in the volatile storage unit 1002 (step S57).

In the management system 50, the terminal state acquisition unit 55 obtains the operation state of each contact candidate terminal (step S58), and transmits the operation information obtained by the communication unit 51 to the terminal 10aa as the state information (step S59).

The terminal 10aa that has received the state information stores the state information in the volatile storage unit 1002 (step S60), and the contact list creation unit 20 newly creates the contact list, and displays the list on the display 120 (step S61). Accordingly, the display is switched to the display of the contact list unique to the user.

FIG. 12 is a diagram illustrating a display example of the contact list after the contact list is switched by the user authentication. FIG. 12 is an example of the contact list displayed on the display 120 of the terminal 10aa by the authentication being performed with a user 100cd in which the ID in the contact list management table of FIG. 8 is "100cd" and the processing of FIG. 11 being executed, and the terminals (10gj, 10kb, and 10tk) that can be transmitted are displayed in the contact list.

In this way, in the present embodiment, the contact list on the terminal 10 is switched by simply performing the user authentication, and therefore, for example, when it is desired to perform transmission to another terminal 10 that is not in the contact list immediately after another user used the terminal 10, the transmission to the terminal 10 of the object contact can be easily and promptly performed by simply performing an easy operation for the user authentication such as holding the IC card without performing complicated work such as restarting of the terminal 10. Accordingly, according to the present embodiment, the terminal 10 can be easily and promptly customized and the security can be strengthened.

FIG. 13 is a diagram illustrating another display example of the contact list after the contact list is switched by the user authentication. Like the display example illustrated in FIG. 12, if the contact list of the terminal 10aa is completely replaced with the contact list of the user 100cd, when it is desired to perform transmission again to the contact unique to the terminal 10aa afterwards, the contact cannot be selected.

Therefore, as illustrated in FIG. 13, the display control unit 16 can be configured such that a tab for switching the contact list is provided at an upper portion of the screen, and for example, the contact list of the terminal 10aa and the contact list of the user 100cd can be easily switched by pressing a right/left key of the operation button 108.

Accordingly, when another user further authenticates the terminal 10aa, it becomes possible to increase the tab at the upper portion of the screen and to select various contact lists. Note that the display control unit 16 may be configured such that the contact unique to the user after the user authentication is added to one contact list instead of dividing the list with the tab.

Second Embodiment

A second embodiment registers personal setting information unique to a user in advance, changes and displays a display form of a contact list based on the personal setting information, and updates the contact list screen in accordance with the authenticated user.

Figure 14:
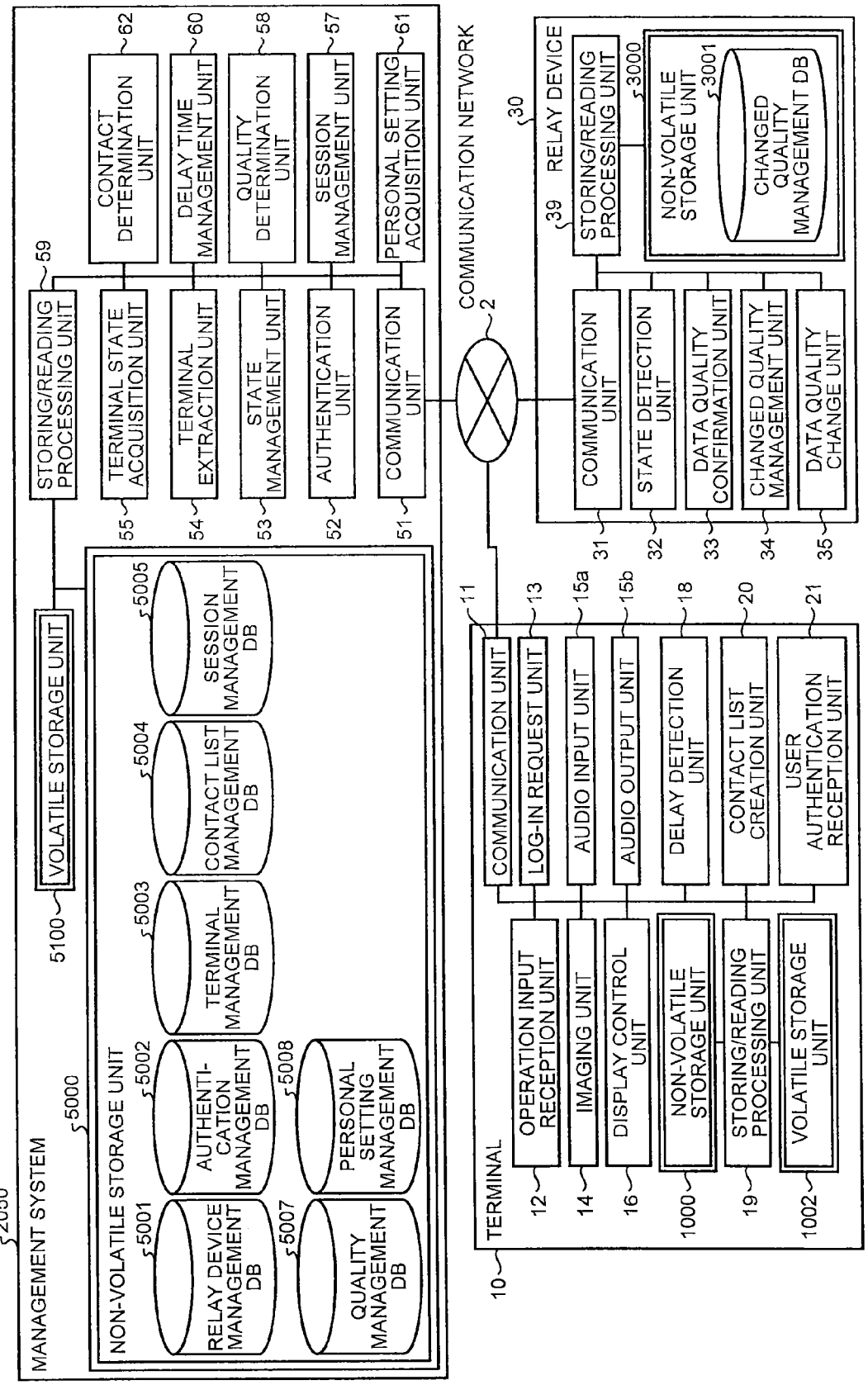
FIG. 14 is a function block diagram of terminals, devices, and systems that configure a transmission system 1 of a second embodiment.

FIG. 14 is a function block diagram of terminals, devices and systems that configure a transmission system 1 of the second embodiment. Functional configurations of a terminal 10 and a relay device 30 are similar to the first embodiment.

As illustrated in FIG. 14, a management system 2050 of the present embodiment is different from the management system 50 of the first embodiment in that the management system 2050 includes a personal setting acquisition unit 61 and the personal setting management DB 5008 is stored in the non-volatile storage unit 5000, and other configurations are similar to those in the first embodiment.

A personal setting management table is registered in the personal setting management DB 5008. This personal setting management table is a table in which a user ID and the personal setting information that indicates a display form of a contact list in the terminal 10 used by the user are in association with each other.

FIG. 15 is a diagram illustrating an example of the personal setting management table. In the personal setting management table, the user ID, and language, a letter size, a background theme, and the personal setting information that indicates a display form like a contact list format are associated with each other as illustrated in FIG. 15.

Here, the language is a display language of the contact list. The letter size is a letter size of a display letter of the contact list. The background theme indicates a theme of background in displaying the contact list. The contact list format indicates whether it is a switching system by a tab and the like illustrated in FIG. 13 or a system of displaying all in the same list.

In the example of FIG. 15, the user having the user ID of "100cd" is indicated such that the display language of the contact list is "English", the letter size of the display letter is "large", the background theme is "normal", the contact list format is not the switching system with a tab, and is a display form in which all are displayed on the same list.

Note that the personal setting information illustrated in FIG. 15 is an example, and is not limited to the example. As the personal setting information, other than the display form, various types of information can be used, such as a method of inputting a letter such as an arrangement of a software keyboard, volume information of a speaker, and network setting information.

Such personal setting information is input by the user in advance using the operation button 108 of the terminal 10. Further, it may be configured such that the personal setting information is input with a web application for setting a terminal 10 capable of accessing by logging in using the authentication information illustrated in FIG. 6.

Referring back to FIG. 14, the personal setting acquisition unit 61 obtains the personal setting information using the user ID from the personal setting management table as a search key. The communication unit 51 transmits the personal setting information obtained in the personal setting acquisition unit 61 to the terminal 10.

In the terminal 10, the communication unit 11 receives the personal setting information from the management system 2050. Then, the display control unit 16 displays the contact list about the user based on the personal setting information.

Figure 16:
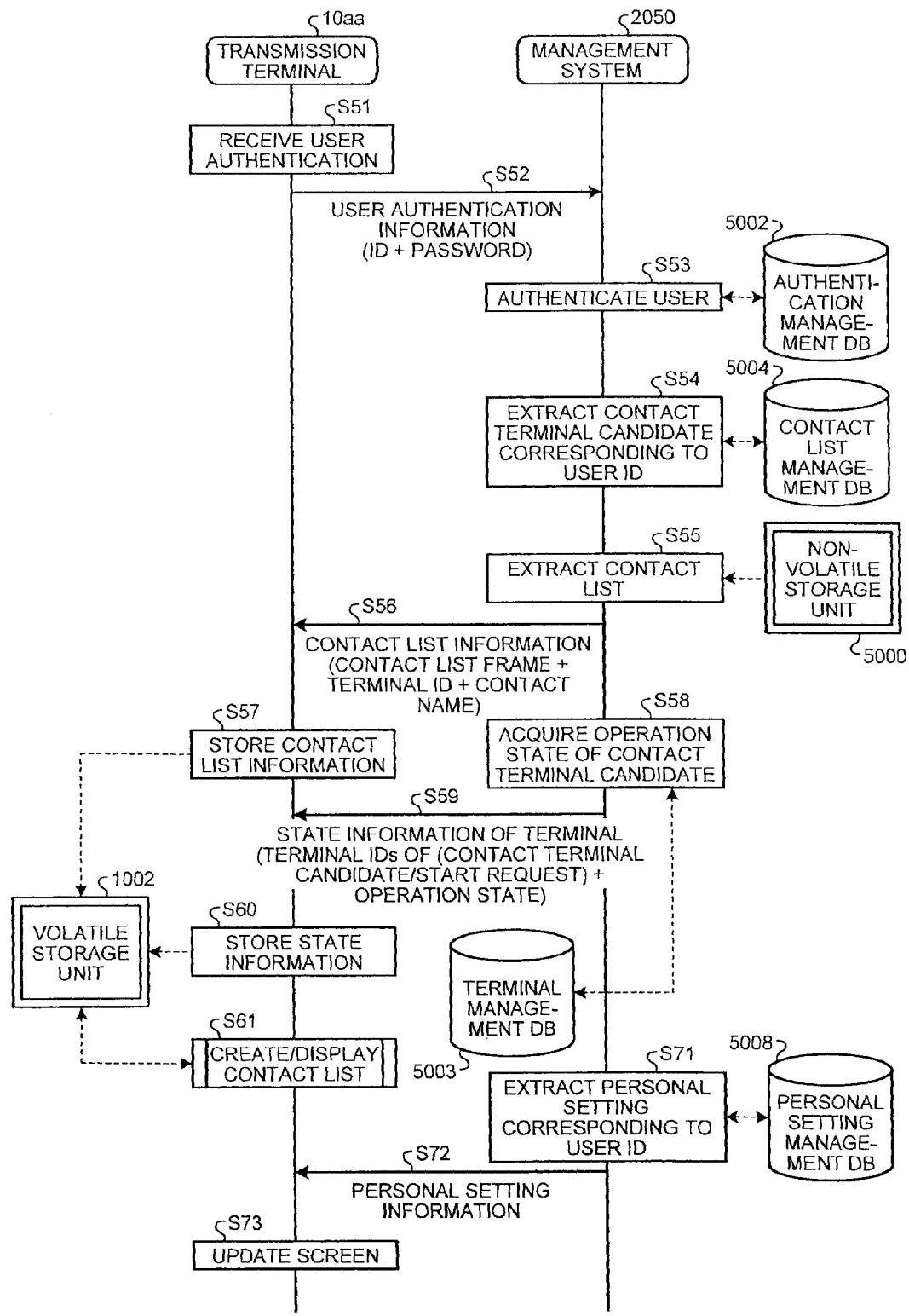
FIG. 16 is a sequence diagram illustrating a flow of processing of switching a contact list in the second embodiment.

Next, processing of switching a contact list by the transmission system of the present embodiment configured as described above will be described. FIG. 16 is a sequence diagram indicating a flow of the processing of switching display of the contact list in the second embodiment.

Processing from reception of user authentication information to update of the contact list (step S51 to S61) is similar to that of switching the contact list in the first embodiment described in FIG. 11.

In the management system 2050, when the user authentication is succeeded, and after a contact terminal candidate corresponding to the user ID is extracted and is transmitted to a terminal 10aa, the personal setting acquisition unit 61 obtains the personal setting information corresponding to the user ID from the personal setting management table (step S71).

The communication unit 51 transmits the extracted personal setting information to the terminal 10aa (step S72). When the communication unit 11 of the terminal 10aa receives the personal setting information, the display control unit 16 updates display content of the contact list screen updated and displayed on the display 120 in accordance with the personal setting information (step S73).

FIG. 17 is a diagram illustrating a display example of the updated contact list based on the personal setting information in the second embodiment. FIG. 17 illustrates a display form of the contact list after the following processing is performed: the user 100cd having the ID of "100cd" performs authentication with respect to the display of the contact list illustrated in FIG. 10, the processing of FIG. 16 is executed, and the personal setting information of the user 100cd is reflected on the contact list.

The personal setting information for the user 100cd is set as illustrated in FIG. 15, and therefore, on the screen of the contact list illustrated in FIG. 17, which is different from the contact list screen of FIG. 10, the display language is changed to English, and the letter size becomes larger. In addition, the format of the contact list is "all display", and therefore, the contact list is not divided with a tab like the display of the contact list of FIG. 13, and shared contacts by the terminal 10aa and contacts uniquely held by the user 100cd are all displayed on the same list.

In this way, according to the present embodiment, the display form of the contact list is changed and displayed based on the personal setting information, and the contact list screen is updated in accordance with the authenticated user. Therefore, the terminal 10 can be easily and promptly customized in a display form for each user base on the personal setting information of the user.

Note that the switching of display based on the personal setting information of the contact list is not frequently performed. Therefore, the display control unit 16 may be configured such that the switching based on the personal setting information is received only when a screen for changing the personal setting information in the terminal 10aa is being displayed, and the switching based on the personal setting information and the update of the contact list is separately performed.

Third Embodiment

While, in the second embodiment, the display form of the contact list is set for each user as the personal setting information, in this third embodiment, a function available for the user is set to the personal setting information in advance, and in the terminal 10, the function available for the user is differentiated and displayed on the menu screen based on the personal setting information, and the menu screen is updated in accordance with the authenticated user.

Functional configurations and hardware configurations of terminals, devices, and systems that configure a transmission system 1 of the third embodiment are similar to the second embodiment.

Figure 18:
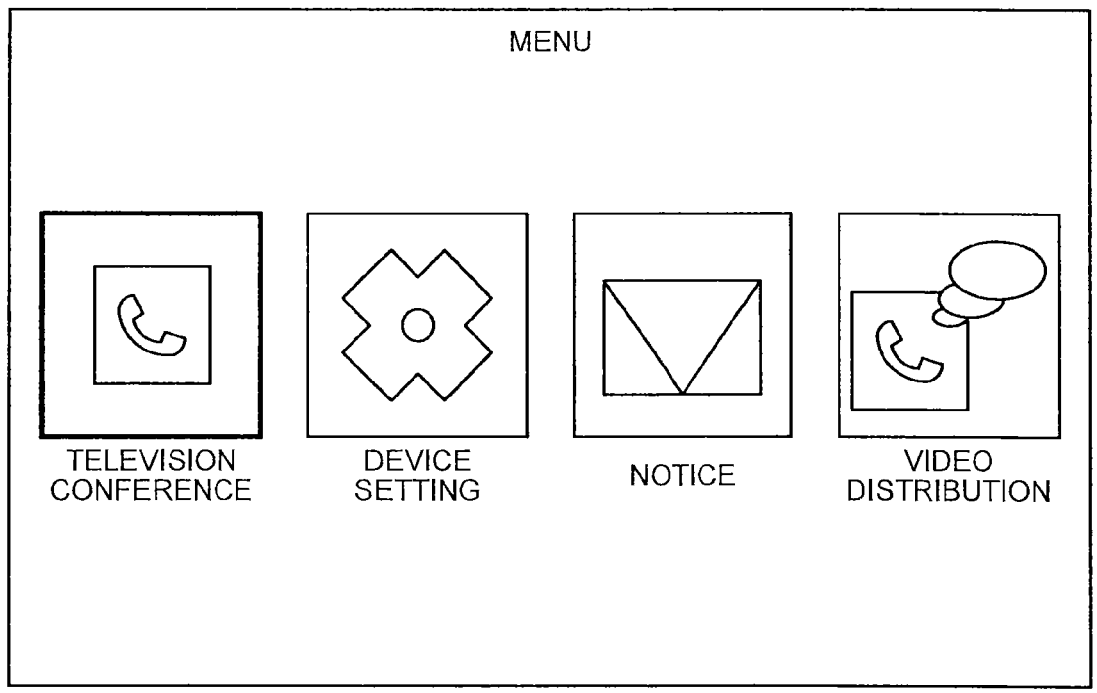
FIG. 18 is a diagram illustrating an example of a menu screen.

A display control unit 16 of a terminal 10 of the present embodiment displays the menu screen on a display 120 by an operation of a user with an operation button 108. FIG. 18 is a diagram illustrating an example of the menu screen. Icons for starting up functions executable by the terminal 10 is displayed on the menu screen as illustrated in FIG. 18.

Note that the display control unit 16 may be configured to display such a menu screen immediately after the start-up of the terminal 10.

When the user selects a desired function from among the functions displayed on the menu screen with the operation button 108, on the terminal 10, the selected function is started up. For example, when it is desired to change the personal setting of the user in the second embodiment, the "device setting" is selected on the menu screen illustrated in FIG. 18, and the device setting function is started up. The available functions of the terminal 10 are stored in a non-volatile storage unit 1000.

Here, the available functions may be different depending on the user. For example, in a case of system administrator, there is a function only available for system administrator. Further, in recent years, there are many forms in which a desired function can be added through a cloud service. Therefore, even a general user, available functions may be different.

Therefore, similarly to the first and second embodiments, when a shared terminal 10 is shared by users, it is desired to easily and promptly switch the menu screen on which the available functions are displayed without requiring effort such as restarting up.

Therefore, in the present embodiment, following configurations are employed. Similarly to the second embodiment, functions available to the user (available functions) are registered on a personal setting management table of a personal setting management DB 5008 of a non-volatile storage unit 5000 of a management system 2050 of the present embodiment in association with IDs, other than the display form of the contact list. FIG. 19 is a diagram illustrating an example of the personal setting management table of the third embodiment.

In the example of FIG. 19, a user 100cd having an ID "100cd" indicates a user who can use a terminal initialization function to initialize the terminal 10 and a connection diagnosis function to diagnose connection. Note that such available functions may be configured to be registered for each terminal ID, other than for each user ID.

The display control unit 16 of the terminal 10 of the present embodiment displays the available functions of the personal setting information received from the management system 2050 on the menu screen. When having received the personal setting information of another user, the display control unit 16 updates the menu screen with the available functions of the personal setting information of the another user and displays the menu screen on the display 120.

Figure 20:
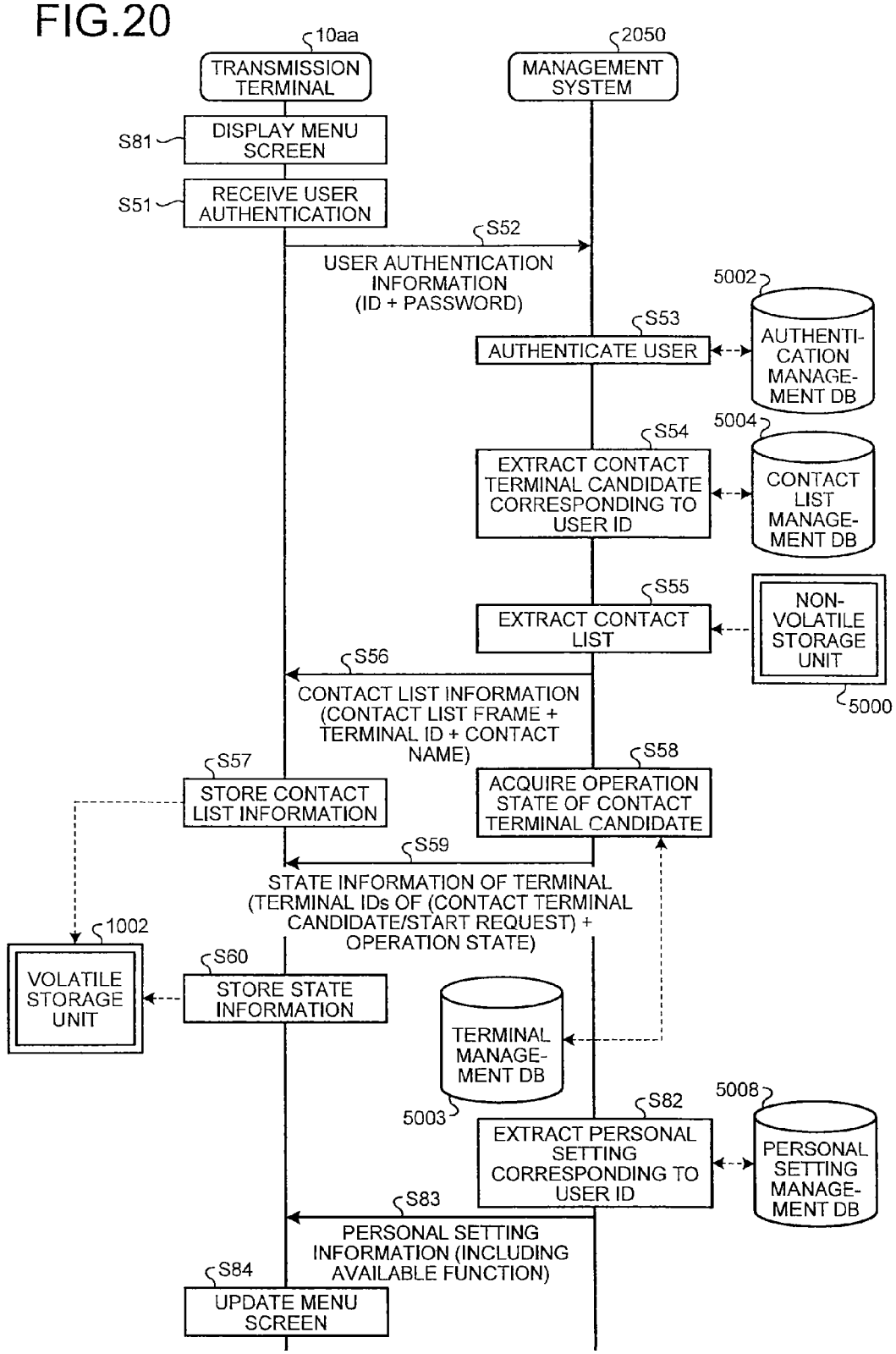
FIG. 20 is a sequence diagram illustrating a flow of processing of updating a menu screen of the third embodiment.

Next, processing of updating the menu screen by the transmission system configured as described above of the embodiment will be described. FIG. 20 is a sequence diagram illustrating a flow of processing of updating the menu screen in the third embodiment.

In the present embodiment, the display control unit 16 of the terminal 10aa displays a menu screen unique to the user who has logged in to the display 120 (step S81).

In this case, assume that another user inputs the authentication information. In this case, processing from reception of the user authentication information to storing of operation information of a contact terminal candidate (steps S51 to S60) is similar to the processing of switching the contact list in the first embodiment described in FIG. 11. Here, in the present embodiment, since the terminal 10aa is displaying the menu screen at step S81, even if the transmission terminal 10aa receives the contact list information from the management system 2050 (step S56), the transmission terminal 10aa only stores the information in a volatile storage unit 1002 (step S57), and does not reflect the information to the display of the display 120.

In the management system 2050, after the user authentication is succeeded, and the contact terminal candidate corresponding to a user ID is extracted and is transmitted to the terminal 10aa, the personal setting acquisition unit 61 obtains the personal setting information corresponding to the user ID from the personal setting management table (step S82). This personal setting information includes the available information of the user. Then, the communication unit 51 of the management system 2050 transmits the obtained personal setting information to the terminal 10aa (step S83).

When the communication unit 11 of the terminal 10aa receives the personal setting information, the display control unit 16 updates the menu screen displayed on the display 120 at step S81 in accordance with the personal setting information (step S84).

Figure 21:
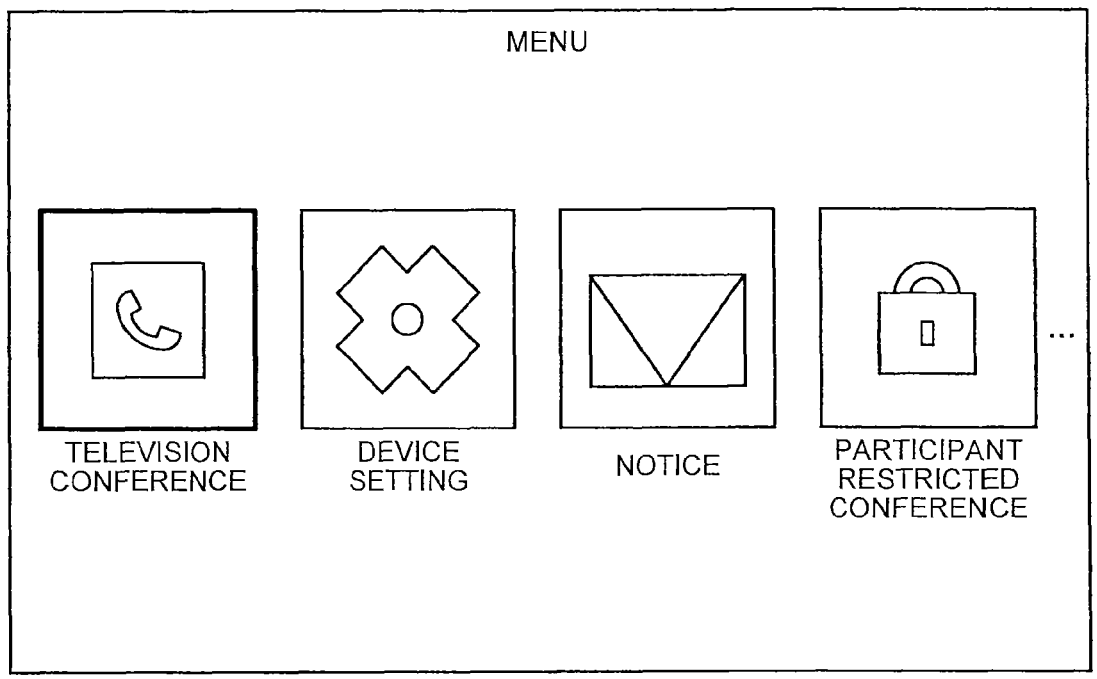
FIG. 21 is a diagram illustrating a display example of the menu screen updated based on personal setting information in the third embodiment.

FIG. 21 is a diagram illustrating a display example of the updated menu screen based on the personal setting information in the third embodiment. FIG. 21 illustrates a menu screen obtained such that a user 100cf of an ID "100cf" performs authentication with respect to the menu screen illustrated in FIG. 18, the processing of FIG. 20 is executed, and the menu screen is updated based on the personal setting information of the user 100cf.

The personal setting information of the user 100cf is set as described in FIG. 19, and therefore, a function of "participant restricted conference" is added to the menu screen illustrated in FIG. 21, compared with the menu screen of FIG. 18.

In this way, according to the present embodiment, the available functions to the user is set to the personal setting information in advance, and in the terminal 10, the available functions are differentiated for each user and displayed on the menu screen based on the personal setting information in accordance with the authenticated user. Therefore, the available menu can be easily and promptly switched without requiring effort such as restarting up. Therefore, for example, when a trouble occurs in a network while the transmission terminal 10 is being used, convenience can be improved such as the connection diagnosis function of the system administrator and the like can be used only with a simple operation such as the system administrator holding an IC card.

According to the present embodiments, effects of easily and promptly customizing a transmission terminal for each user and strengthening security can be exerted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system comprising a transmission terminal, that is configured to perform communication with at least one counterpart transmission terminal, and a management device connected to the transmission terminal over a network,
the management device comprising:
a memory configured to store authentication management information in which identification information for identifying the transmission terminal or a first user who uses the transmission terminal, and authentication information of the transmission terminal or the first user are associated with each other, and contact list management information in which the identification information for identifying the transmission terminal or the first user, and the identification information of one or a plurality of contact terminal candidates serving as a potential counterpart transmission terminal of the transmission terminal or the first user for the communication are associated with each other; and
circuitry configured to
control reception of a log-in request including the identification information and the authentication information of the transmission terminal or the first user from the transmission terminal,
perform authentication of the transmission terminal or the first user based on the identification information and the authentication information of the transmission terminal or the first user included in the log-in request, and the authentication management information,
when the transmission terminal or the first user is authenticated and in a log-in state, extract, from the contact list management information, the identification information of the contact terminal candidate corresponding to the identification information of the authenticated transmission terminal or the authenticated first user, and
control transmission of contact list information including the identification information of the extracted contact terminal candidate to the transmission terminal, and
the transmission terminal comprising:
circuitry configured to
control transmission of the log-in request including the identification information and the authentication information of the transmission terminal or the first user to the management device,
control reception of the contact list information from the management device,
create a contact list about the transmission terminal or the first user, the contact list including information related to a contact terminal candidate of the transmission terminal or the first user, based on the contact list information,
control display of the contact list about the transmission terminal or the first user on a display, and
while maintaining the transmission terminal or the first user in a log-in state, acquire identification information and authentication information of a second user who uses the transmission terminal, the identification information and authentication information of the second user being different from the identification information and authentication information of the transmission terminal or the first user, and wherein the transmission terminal acquires the identification information and authentication information of the second user locally at the transmission terminal,
wherein the circuitry of transmission terminal controls transmission of the identification information and the authentication information of the second user to the management device,
the circuitry of the management device controls reception of the identification information and the authentication information of the second user from the transmission terminal,
in a case of receiving the identification information and the authentication information of the second user, the circuitry of the management device performs authentication of the second user based on the authentication management information, in a case where the second user is authenticated, the circuitry of the management device acquires the identification information of the contact terminal candidate corresponding to the identification information of the second user from the contact list management information, the circuitry of the management device controls transmission of, to the transmission terminal, contact list information about the second user, the contact list information including the extracted identification information of the contact terminal candidate corresponding to the identification information of the second user, the circuitry of the transmission terminal controls reception of the contact list information about the second user from the management device, the circuitry of the transmission terminal creates a contact list about the second user based on the contact list information about the second user, and the circuitry of the transmission terminal controls display of the contact list of the second user on the display, wherein when the second user enters a log-in state to the management device via the transmission terminal while the fist user is in the log-in state to the management device via the transmission terminal, the transmission terminal updates the displayed contact list about the transmission terminal or the first user on the display to display the contact list of the second user.

2. The communication system according to claim 1, wherein the circuitry of the transmission terminal controls deletion of the contact list information about the transmission terminal or the first user on the display when controlling display of the contact list information about the second user on the display.

3. The communication system according to claim 1, wherein the circuitry of the transmission terminal controls display of the contact list information about the second user and the contact list information about the transmission terminal or the first user in a switchable manner.

4. The communication system according to claim 1,
wherein the memory of the management device is further configured to store personal setting management information in which the identification information of a respective user and personal setting information indicating a display form of the contact list in the transmission terminal used by the respective user are associated with each other; and the circuitry of the management device is configured to acquire the personal setting information corresponding to identification information of the respective user from the personal setting management information, and the circuitry of the management device further controls transmission of the acquired personal setting information to the transmission terminal, the circuitry of the management device further controls reception of the personal setting information from the management device, and the circuitry of the transmission terminal is configured to control display of the contact list of the respective user on the display based on the personal setting information.

5. The communication system according to claim 4, wherein the personal setting management information associates the identification information of the respective user with a function available to the user as the personal setting information, and the circuitry of the transmission terminal is configured to control display of the available function of the personal setting information on a menu screen, and when having received the personal setting information of another user different from the respective user, the circuitry is configured to control update and display of the menu screen with the available function of the personal setting information of the another user.

6. The communication system according to claim 1,
wherein the circuitry of the transmission terminal is configured to read out the identification information and the authentication information from a portable storage medium in which the identification information and the authentication information are stored.

7. A communication method performed by a communication system comprising a transmission terminal that is configured to perform communication with at least one counterpart transmission terminal, and a management device connected to the transmission terminal over a network, the management device comprising memory configured to store authentication management information in which identification information for identifying the transmission terminal or a first user who uses the transmission terminal, and authentication information of the transmission terminal or the first user are associated with each other, and contact list management information in which the identification information for identifying the transmission terminal or the first user, and the identification information of one or a plurality of contact terminal candidates serving as a potential counterpart transmission terminal of the transmission terminal or the first user for the communication are associated with each other, and the communication method comprising:

transmitting, by the transmission terminal, a log-in request including the identification information and the authentication information of the transmission terminal or the first user to the management device;

receiving, by the management device, the log-in request from the transmission terminal;

performing, by the management device, authentication of the transmission terminal or the first user based on the identification information and the authentication information of the transmission terminal or the first user included in the log-in request, and the authentication management information;

when the transmission terminal or the first user is authenticated and in a log-in state, extracting, by the management device, from the contact list management information, the identification information of the contact terminal candidate corresponding to the identification information of the authenticated transmission terminal or the authenticated user;

transmitting, by the management device, contact list information including the identification information of the extracted contact terminal candidate to the transmission terminal;

receiving, by the transmission terminal, the contact list information from the management device;

creating, by the transmission terminal, a contact list about the transmission terminal or the first user, the contact list including information related to a contact terminal candidate of the transmission terminal or the first user, based on the contact list information;

controlling display, by the transmission terminal, of the contact list about the transmission terminal or the first user on a display;

while in a log-in state of the first user and without performing a resetting operation at the transmission terminal, acquiring, by the transmission terminal, identification information and authentication information of a second user who uses the transmission terminal, the identification information and authentication information of the second user being different from the identification information and authentication information of the transmission terminal or the first user, and wherein the transmission terminal acquires the identification information and authentication information of the second user locally at the transmission terminal;

transmitting, by the transmission terminal, the identification information and the authentication information of the second user to the management device;

receiving, by the management device, the identification information and the authentication information of the second user from transmission terminal;

in a case of receiving the identification information and the authentication information of the second user, performing, by the management device, authentication of the second user based on the authentication management information;

in a case where the second user is authenticated, acquiring, by the management device, the identification information of the contact terminal candidate corresponding to the identification information of the second user from the contact list management information;

transmitting, by the management device, to the transmission terminal, contact list information about the second user, the contact list information including the extracted identification information of the contact terminal candidate corresponding to the identification information of the second user;

receiving, by the transmission terminal, the contact list information about the second user from the management device;

creating, by the transmission terminal, a contact list about the second user based on the contact list information about the second user; and controlling display, by the transmission terminal, of the contact list of the second user on the display, wherein when the second user enters a log-in state to the management device via the transmission terminal while the fist user is in the log-in state to the management device via the transmission terminal, the transmission terminal updates the displayed contact list about the transmission terminal or the first user on the display to display the contact list of the second user.

8. A non-transitory computer-readable recording medium for storing therein a computer program that includes instructions which when executed on a transmission terminal causes the transmission terminal to execute a communication method with a management device in a communication system, the communication system comprising the transmission terminal, that is configured to perform communication with at least one counterpart transmission terminal, and the management device connected to the transmission terminal over a network, the management device comprising a memory configured to store authentication management information in which identification information for identifying a first user who uses the transmission terminal, and authentication information of the first user are associated with each other, and contact list management information in which the identification information for identifying the first user, and the identification information of one or a plurality of contact terminal candidates serving as a potential counterpart transmission terminal of the transmission terminal or the first user for the communication are associated with each other, the communication method comprising:

controlling transmission of log-in request including the identification information and the authentication information of the transmission terminal or the first user to the management device;

controlling reception of contact list information from the management device;

creating a contact list about the transmission terminal or the first user, the contact list including information related to a contact terminal candidate of the transmission terminal or the first user, based on the contact list information;

controlling display of the contact list about the first user on a display; and while in a log-in state of the transmission terminal or the first user, transmitting identification information and authentication information of a second user who uses the transmission terminal, the identification information and authentication information of the second user being different from the identification information and authentication information of the transmission terminal or the first user, and wherein the transmission terminal acquires the identification information and authentication information of the second user locally at the transmission terminal;

controlling reception of contact list information about the second user from the management device, the contact list information including identification information of a contact terminal candidate corresponding to the identification information of the second user, creating a contact list about the second user based on the contact list information about the second user, and controlling display of the contact list of the second user on the display, wherein when the second user enters a log-in state to the management device via the transmission terminal while the fist user is in the log-in state to the management device via the transmission terminal, the transmission terminal updates the displayed contact list about the transmission terminal or the first user on the display to display the contact list of the second user.

* * * * *